(12) United States Patent
Ito et al.

(10) Patent No.: US 11,250,875 B2
(45) Date of Patent: Feb. 15, 2022

(54) BEHAVIOR SUPPORT SYSTEM, BEHAVIOR SUPPORT APPARATUS, BEHAVIOR SUPPORT METHOD, AND STORAGE MEDIUM STORING PROGRAM THEREOF

(71) Applicant: HONDA MOTOR CO., LTD., Tokyo (JP)

(72) Inventors: Atsushi Ito, Wako (JP); Yasumasa Matsui, Tokyo (JP); Kota Nakauchi, Wako (JP); Yasuaki Tezuka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 225 days.

(21) Appl. No.: 16/580,794

(22) Filed: Sep. 24, 2019

(65) Prior Publication Data
US 2020/0020352 A1    Jan. 16, 2020

Related U.S. Application Data

(63) Continuation of application No. PCT/JP2017/013591, filed on Mar. 31, 2017.

(51) Int. Cl.
*G10L 25/63* (2013.01)
*G06F 3/01* (2006.01)
(Continued)

(52) U.S. Cl.
CPC ............. *G10L 25/63* (2013.01); *G06F 3/013* (2013.01); *G06K 9/00302* (2013.01);
(Continued)

(58) Field of Classification Search
CPC .......... G06F 3/012; G06F 3/013; G06F 3/016; G06K 9/00302; G08B 25/016;
(Continued)

(56) References Cited

U.S. PATENT DOCUMENTS 5,243,659 A * 9/1993 Stafford ................. A42B 3/303
381/110
5,647,011 A * 7/1997 Garvis ................... H03G 3/342
381/104
(Continued)

FOREIGN PATENT DOCUMENTS

JP    2000-118260 A    4/2000
JP    2001-056225 A    2/2001
(Continued)

OTHER PUBLICATIONS

International Search Report for PCT/JP2017/013591 dated Jul. 4, 2017 (partially translated).
IPRP for PCT/JP2017/013591 dated Oct. 29, 2018.

*Primary Examiner* — Gerald Gauthier
(74) *Attorney, Agent, or Firm* — Thomas | Horstemeyer, LLP

(57) ABSTRACT

A behavior support system that implements behavior support taking account of uncertain information obtained in a vehicle is provided. Uncertain information containing at least a conversation between passengers is obtained and analyzed. Support information for supporting behaviors of the passengers is obtained based on a result of the analysis, and the obtained support information is output to a helmet of at least one of a first passenger and a second passenger. New information regarding a word for the second passenger is obtained as the support information, based on the word obtained from the second passenger, and the support information is output to the first passenger so that the new information is provided from the first passenger to the second passenger.

17 Claims, 15 Drawing Sheets

(51) Int. Cl.
  *G06K 9/00* (2022.01)
  *G10L 15/22* (2006.01)
  *G10L 15/30* (2013.01)
  *H04W 4/44* (2018.01)

(52) U.S. Cl.
  CPC .............. *G10L 15/22* (2013.01); *G10L 15/30* (2013.01); *H04W 4/44* (2018.02)

(58) Field of Classification Search
  CPC ................ G08G 1/166; G08G 1/0141; G08G 1/096883; G10L 15/22; G10L 15/30; G10L 25/63; H04R 1/406; H04W 114/44; H04W 4/023; H04W 4/40
  USPC ....... 2/425; 340/438, 439, 432; 381/86, 108, 381/123; 455/41.2, 411, 569.1, 575.2, 455/418; 701/1, 2, 31.4; 704/270; 715/706; 482/9
  See application file for complete search history.

(56) References Cited

U.S. PATENT DOCUMENTS

| | | | | |
|---|---|---|---|---|
| 6,732,381 | B1* | 5/2004 | Lal | A42B 3/0433 2/422 |
| 7,076,279 | B2* | 7/2006 | Tabata | H04R 1/08 455/575.1 |
| 8,290,480 | B2* | 10/2012 | Abramson | H04W 4/40 455/418 |
| 9,727,790 | B1* | 8/2017 | Vaziri | G06F 3/012 |
| 9,919,648 | B1* | 3/2018 | Pedersen | G08G 1/096783 |
| 10,302,444 | B2 | 5/2019 | Miyajima | |
| 10,423,991 | B1* | 9/2019 | Jeon | G08G 1/005 |
| 2003/0220076 | A1* | 11/2003 | Katayama | H04W 52/0277 455/41.2 |
| 2009/0023422 | A1* | 1/2009 | MacInnis | G06F 16/2379 455/411 |
| 2010/0274440 | A1* | 10/2010 | Kim | G07C 5/008 701/31.4 |
| 2011/0319142 | A1* | 12/2011 | Chen | H04M 1/6058 455/569.1 |
| 2012/0143391 | A1* | 6/2012 | Gee | B60K 37/06 701/1 |
| 2013/0038437 | A1* | 2/2013 | Talati | B60K 37/06 340/438 |
| 2013/0304475 | A1* | 11/2013 | Gratke | H04R 3/00 704/270 |
| 2014/0334644 | A1* | 11/2014 | Selig | G06F 3/165 381/108 |
| 2015/0127351 | A1* | 5/2015 | Buck | G10L 21/02 704/270 |
| 2015/0285376 | A1* | 10/2015 | Hageman | B62J 99/00 340/432 |
| 2015/0367176 | A1* | 12/2015 | Bejestan | G01S 5/0263 482/9 |
| 2016/0004299 | A1* | 1/2016 | Meyer | G06F 9/453 715/706 |
| 2016/0023636 | A1* | 1/2016 | Keating | B62J 45/10 701/2 |
| 2016/0375769 | A1* | 12/2016 | Shiota | B60K 37/02 340/439 |
| 2017/0146358 | A1* | 5/2017 | Ward | G01C 21/3652 |
| 2017/0354196 | A1* | 12/2017 | Tammam | B60Q 9/008 |
| 2017/0366935 | A1* | 12/2017 | Ahmadzadeh | H04M 1/72454 |
| 2017/0370744 | A1 | 12/2017 | Miyajima | |
| 2018/0077538 | A1* | 3/2018 | Matus | G08B 21/04 |
| 2020/0020352 | A1* | 1/2020 | Ito | G10L 15/22 |
| 2021/0229698 | A1* | 7/2021 | Kim | H04B 7/0413 |

FOREIGN PATENT DOCUMENTS

| | | |
|---|---|---|
| JP | 2001-280982 A | 10/2001 |
| JP | 2003-224653 A | 8/2003 |
| JP | 2003-308407 A | 10/2003 |
| JP | 2009-098964 A | 5/2009 |
| JP | 2009-177440 A | 8/2009 |
| JP | 2014-167438 A | 9/2014 |
| JP | 2016-206469 A | 12/2016 |
| WO | 2016/121174 A1 | 8/2016 |
| WO | 2018/179331 A1 | 10/2018 |

\* cited by examiner

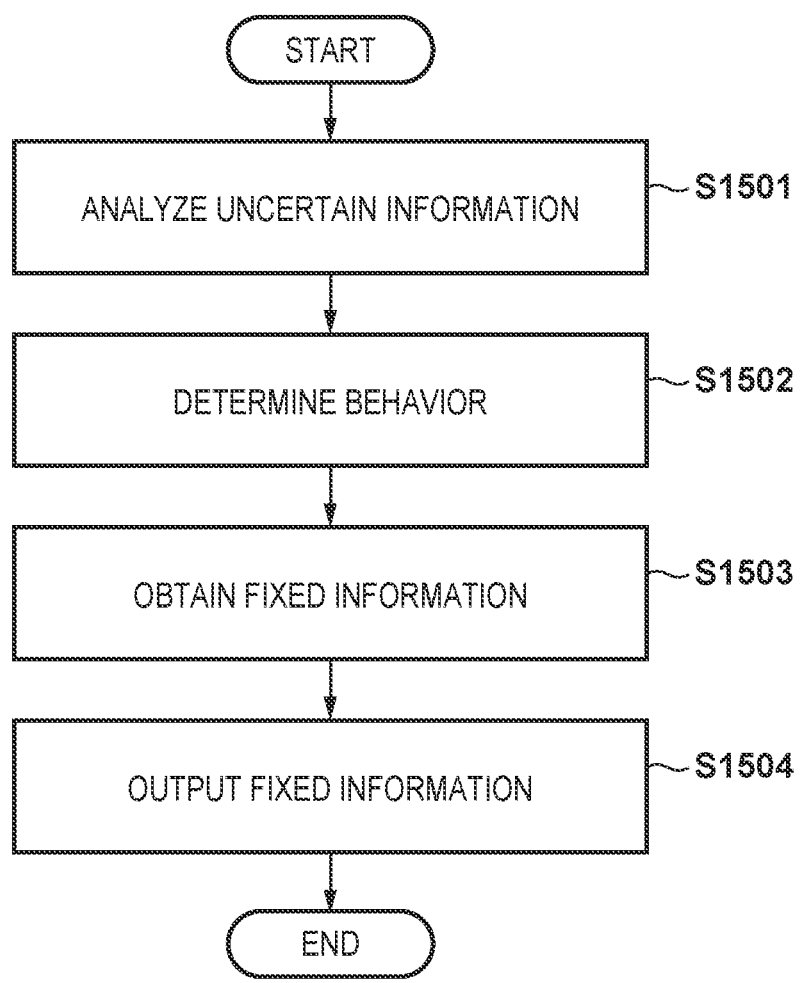

FIG. 16

SEARCH WORD: 2016/10/2  13:00  "KYOTO"
2016/10/5  15:40  "aaa COMPANY"
2016/10/7  08:21  "ITALIAN"
2016/10/8  12:30  "bbb SKI HILL"
2016/10/11  11:00  "ACTOR ccc"
2016/10/30  17:30  "MOVIE XYZ"
. . .

⬇

| CATEGORY | WORD | CATEGORIES WITH CORRELATION |
|---|---|---|
| TRAVEL | KYOTO (11/30), bbb SKI HILL (5/12), ... | HOBBY, SPORTS, ... |
| HOBBY | KYOTO (7/30), bbb SKI HILL (3/12), ... | TRAVEL, SPORTS, ... |
| SPORTS | bbb SKI HILL (2/12), ... | TRAVEL, HOBBY, ... |
| PLACES | KYOTO (6/30), HOKKAIDO (3/8), ... | TRAVEL, HOBBY, SPORTS, BUSINESS, ... |
| FOOD | ITALIAN (13/41), KYOTO (2/30), SOBA (18/52), TOFU (5/14), ... | TRAVEL, HEALTH CARE, ... |
| HEALTH CARE | ITALIAN (8/41), aaa COMPANY (4/7), ... | BUSINESS, FOOD, ... |
| MOVIE | ACTOR ccc (8/19), MOVIE XYZ(17/28), KYOTO (2/30), ... | ENTERTAINMENT, TRAVEL, DRAMA, PLACES, ... |
| ENTERTAINMENT | ACTOR ccc (6/19), MOVIE XYZ(9/28), ... | MOVIE, DRAMA, ... |
| DRAMA | ACTOR ccc(1/19), ... | MOVIE, ENTERTAINMENT, ... |
| BUSINESS | aaa COMPANY(3/7), ... | HEALTH CARE, PLACE, ... |
| . . . | . . . | . . . |

FREQUENTLY APPEARANCE WORD "MOVIE" ⇒

⬇ MOVIE "XYZ"

BEHAVIOR SUPPORT SYSTEM, BEHAVIOR SUPPORT APPARATUS, BEHAVIOR SUPPORT METHOD, AND STORAGE MEDIUM STORING PROGRAM THEREOF

CROSS-REFERENCE TO RELATED APPLICATION

This application is a continuation of International Patent Application No. PCT/JP2017/013591 filed on Mar. 31, 2017, the entire disclosures of which is incorporated herein by reference.

TECHNICAL FIELD

The present invention relates to a behavior support system for supporting the behavior of a passenger, a behavior support apparatus, a behavior support method, and a storage medium storing a program thereof.

BACKGROUND ART

Recently, an apparatus for supporting a user's behavior is emerging. PTL 1 describes an apparatus by which attribute information and behavior schedule information of the user are input in advance, and, before the start time of a scheduled behavior, the behavior of the user is supported, for example, a web page is displayed. Also, PTL 2 describes an apparatus that implements an agent having a pseudo-personality matching the taste of the user in a vehicle.

CITATION LIST

Patent Literature

PTL 1: Japanese Patent Laid-Open No. 2003-308407
PTL 2: Japanese Patent Laid-Open No. 2001-056225

SUMMARY OF INVENTION

Technical Problem

There is a case in which a plurality of passengers exist in a single vehicle, or a case in which passengers in different vehicles have conversations or the like. In this case, information such as conversations and gestures obtained in the vehicle becomes more uncertain than that obtained when there is a single passenger. PTL 1 and PTL 2 do not take account of behavior support that takes uncertain information obtained in a vehicle into consideration.

It is an object of the present invention to provide a behavior support system that implements behavior support taking account of uncertain information obtained in a vehicle, a behavior support apparatus, a behavior support method, and a program.

Solution to Problem

A behavior support system according to the present invention is a behavior support system for supporting a behavior of at least one of passengers in a saddle riding type vehicle, comprising: a first obtaining unit configured to obtain uncertain information of a first passenger and a second passenger, the uncertain information containing at least a conversation between the passengers; a first analyzing unit configured to analyze the uncertain information obtained by the first obtaining unit; second obtaining unit configured to obtain support information for supporting behaviors of the passengers, based on a result of the analysis by the first analyzing unit; and an output unit configured to selectively output the support information obtained by the second obtaining unit to a helmet of at least one of the first passenger and the second passenger, based on the result of the analysis by the first analyzing unit, wherein the second obtaining unit obtains, as the support information, new information regarding a word for the second passenger, based on the word obtained from the second passenger, and the output unit outputs the support information to the first passenger so that the new information is provided from the first passenger to the second passenger.

A behavior support apparatus according to the present invention is a behavior support apparatus for supporting a behavior of at least one of passengers in a saddle riding type vehicle, comprising: a first obtaining unit configured to obtain uncertain information of a first passenger and a second passenger, the uncertain information containing at least a conversation between the passengers; an analyzing unit configured to analyze the uncertain information obtained by the first obtaining unit; a second obtaining unit configured to obtain support information for supporting behaviors of the passengers, based on a result of the analysis by the analyzing unit; and an output unit configured to selectively output the support information obtained by the second obtaining unit to a helmet of at least one of the first passenger and the second passenger, based on the result of the analysis by the analyzing unit, wherein the second obtaining unit obtains, as the support information, new information regarding a word for the second passenger, based on the word obtained from the second passenger, and the output unit outputs the support information to the first passenger so that the new information is provided from the first passenger to the second passenger.

A behavior support method according to the present invention is a behavior support method of supporting a behavior of at least one of passengers in a saddle riding type vehicle, comprising: a first obtaining step of obtaining uncertain information of a first passenger and a second passenger, the uncertain information containing at least a conversation between the passengers; an analyzing step of analyzing the uncertain information obtained in the first obtaining step; a second obtaining step of obtaining support information for supporting behaviors of the passengers, based on a result of the analysis in the analyzing step; and an output step of selectively outputting the support information obtained in the second obtaining step to a helmet of at least one of the first passenger and the second passenger, based on the result of the analysis in the analyzing step, wherein the second obtaining step obtains, as the support information, new information regarding a word for the second passenger, based on the word obtained from the second passenger, and the output step outputs the support information to the first passenger so that the new information is provided from the first passenger to the second passenger.

A non-transitory computer-readable storage medium storing a program according to the present invention is a non-transitory computer-readable storage medium storing a program causing a computer to execute: a first obtaining step of obtaining uncertain information of a first passenger and a second passenger in a saddle riding type vehicle, the uncertain information containing at least a conversation between the passengers; an analyzing step of analyzing the uncertain information obtained in the first obtaining step; a second obtaining step of obtaining support information for supporting behaviors of the passengers, based on a result of the analysis in the analyzing step; and an output step of selectively outputting the support information obtained in the second obtaining step to a helmet of at least one of the first passenger and the second passenger, based on the result of the analysis in the analyzing step, wherein the second obtaining step obtains, as the support information, new information regarding a word for the second passenger, based on the word obtained from the second passenger, and the output step outputs the support information to the first passenger so that the new information is provided from the first passenger to the second passenger.

Advantageous Effects of Invention

The present invention can implement behavior support taking account of uncertain information obtained in a vehicle.

BRIEF DESCRIPTION OF DRAWINGS

FIG. 15 is a flowchart showing a process of outputting fixed information;
and
FIG. 16 is a view showing data stored in a DB.

DESCRIPTION OF EMBODIMENTS

First Embodiment

Figure 1:
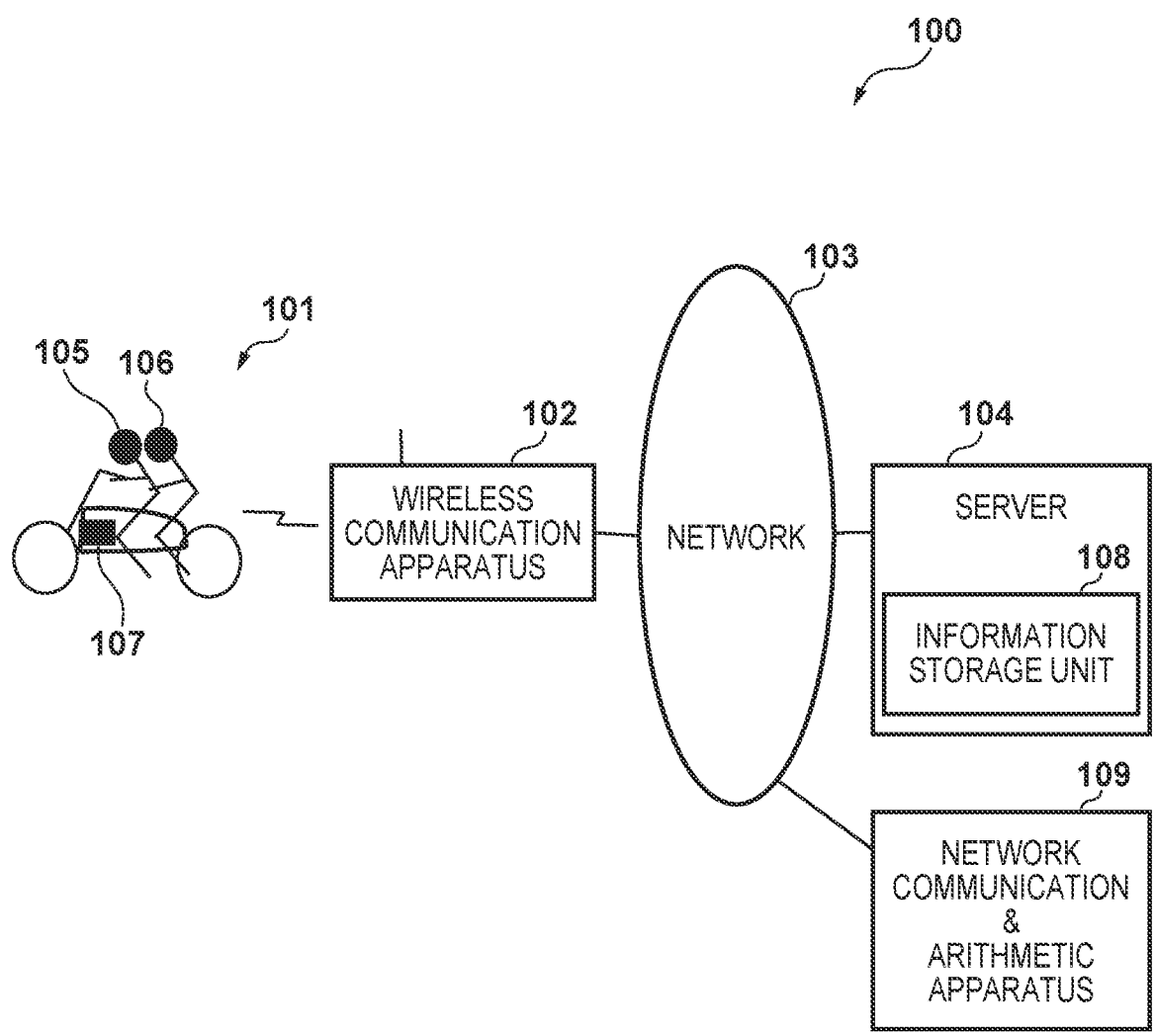
FIG. 1 is a view showing the overall configuration of a support system.

FIG. 1 is a view showing the overall configuration of a behavior support system according to this embodiment. The behavior support system according to this embodiment can support the behavior of a passenger (a rider, a driver, or a fellow passenger) in a moving vehicle based on uncertain information obtained from the passenger. As shown in FIG. 1, a behavior support system 100 includes a motorcycle 101, a wireless communication apparatus 102, a network 103, a server 104, and a network communication & arithmetic apparatus 109. In this embodiment, the motorcycle 101 is a so-called saddle riding type vehicle, and includes a three-wheeled vehicle and the like in addition to a two-wheeled vehicle. The motorcycle 101 and the wireless communication apparatus 102 perform wireless communication, and the wireless communication apparatus 102 and the server 104 perform communication across the network 103. The network 103 is, for example, the Internet or a dedicated communication network, and can partially include a telephone communication network of a mobile phone or the like. The wireless communication apparatus 102 is installed in a public facility such as a traffic signal, and is sometimes configured as a wireless base station of a mobile phone communication network. The wireless communication apparatus 102 is installed for each predetermined area. In this embodiment, it is assumed that, as shown in FIG. 1, two riders (a rider A as a driver and a rider B as a fellow passenger hereinafter) are riding on the motorcycle 101. These riders are wearing helmets 105 and 106. In this embodiment, each of the helmets 105 and 106 functions as a support information receiver that receives information provided from the behavior support system 100 and outputs the received information. In the following description, the support information receiver will be explained as a helmet because the passengers are riders. However, the support information receiver is not limited to a helmet. When using a four-wheeled automobile instead of the motorcycle 101 in this embodiment, the support information receiver is, for example, a display (display unit) or a speaker in the vehicle, or a control board for controlling them. In addition, an information transmitter 107 for implementing the operation of the behavior support system 100 is mounted on the motorcycle 101. The information transmitter 107 performs communication between the wireless communication apparatus 102 and the helmets 105 and 106.

The server 104 is connected to the network 103 and includes an information storage unit 108. The information storage unit 108 stores Internet information (to be described later), a personal database (DB), cloud information, and the like. The network communication & arithmetic apparatus 109 performs communication control across the network 103, and can execute an algorithm to be used as an AI (Artificial Intelligence).

FIG. 1 shows only one motorcycle 101, but a plurality of motorcycles 101 can share the wireless communication apparatus 102. Also, FIG. 1 shows only one wireless communication apparatus 102, but a plurality of wireless communication apparatuses 102 can be used in a plurality of areas. In addition, FIG. 1 shows only one server 104 and only one network communication & arithmetic apparatus 109, but each can also be configured by a plurality of apparatuses. Furthermore, the server 104 can also be configured as a cloud.

When the network 103 includes a telephone communication network of a mobile phone or the like, the information transmitter 107 of the motorcycle 101 can operate as a portable terminal. In this case, the information transmitter 107 can also associate it with the contractor ID or the like of the portable terminal of the rider A, by setting performed via a user interface screen from the rider A. In a configuration like this, the server 104 can use personal information and service information of the rider A managed by a mobile phone system.

Figure 2:
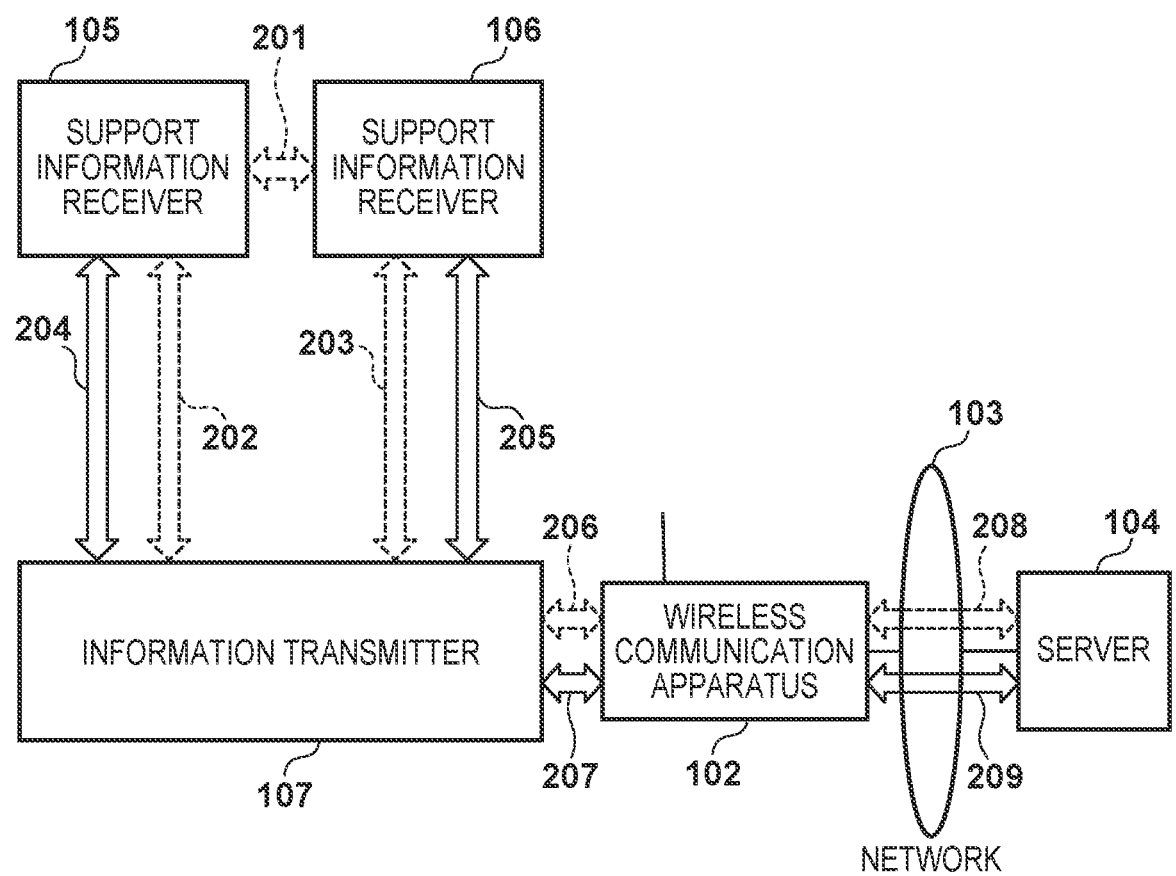
FIG. 2 is a view showing a communication network in the support system.

FIG. 2 is a view showing a communication network in the behavior support system 100. Communication in the behavior support system 100 includes two types of communications, that is, voice communication and data communication. FIG. 2 conceptually shows the system including the voice communication network and the data communication network, and does not represent them as different communication networks. For example, these two communication networks are sometimes implemented as the same packet communication network.

In the behavior support system 100, the helmets 105 and 106 perform voice communication 201. The voice communication 201 enables conversations between the riders A and B. Also, voice communication 202 transmits a voice signal of the rider A wearing the helmet 105 to the information transmitter 107, and voice communication 203 transmits a voice signal of the rider B wearing the helmet 106 to the information transmitter 107. The information transmitter 107 transmits a voice guidance to one or both of the helmets 105 and 106. The information transmitter 107 obtains a sensor signal or imaging data obtained by a camera from the helmet 105 by data communication 204. In addition, the information transmitter 107 obtains a sensor signal or imaging data obtained by a camera from the helmet 106 by data communication 205.

The information transmitter 107 transmits the voice signals, which are transmitted from the helmets 105 and 106, to the wireless communication apparatus 102 by voice communication 206. The wireless communication apparatus 102 transmits the voice signals, which are transmitted from the information transmitter 107, to the server 104 by voice communication 208. The server 104 transmits a voice guidance to the wireless communication apparatus 102 by the voice communication 208. The wireless communication apparatus 102 transmits the voice guidance to the information transmitter 107 by the voice communication 206.

The information transmitter 107 transmits sensor signals and imaging data obtained from sensors and cameras attached to the helmets 105 and 106 and the motorcycle 101 to the wireless communication apparatus 102 by data communication 207. The wireless communication apparatus 102 transmits the sensor signals and imaging data, which are transmitted from the information transmitter 107, to the server 104 by data communication 209.

In the behavior support system 100 shown in FIGS. 1 and 2, an appropriate voice guidance is transmitted to at least one of the riders A and B of the motorcycle 101, based on voice communication (conversation) between the riders A and B, or on information representing the gestures of the riders A and B or biological information of the riders A and B. The information representing the gesture of the rider and the biological information of the rider are obtained as sensor information. Examples of the information representing the gesture of the rider are the line of sight, blink, and yawn of the rider. Examples of the biological information of the rider are the heart rate and the body temperature.

That is, the behavior support system 100 provides the subject of conversation, advice information, and the like as the voice guidance, based on uncertain information that momentarily changes, such as a conversation between the riders and the physical conditions of the riders. This implements a behavior support system that appropriately supports the behaviors of riders by taking account of uncertain information of the riders. Note that the voice guidance is provided in the above explanation, but a display panel of the motorcycle 101 sometimes displays guidance information.

Figure 3:
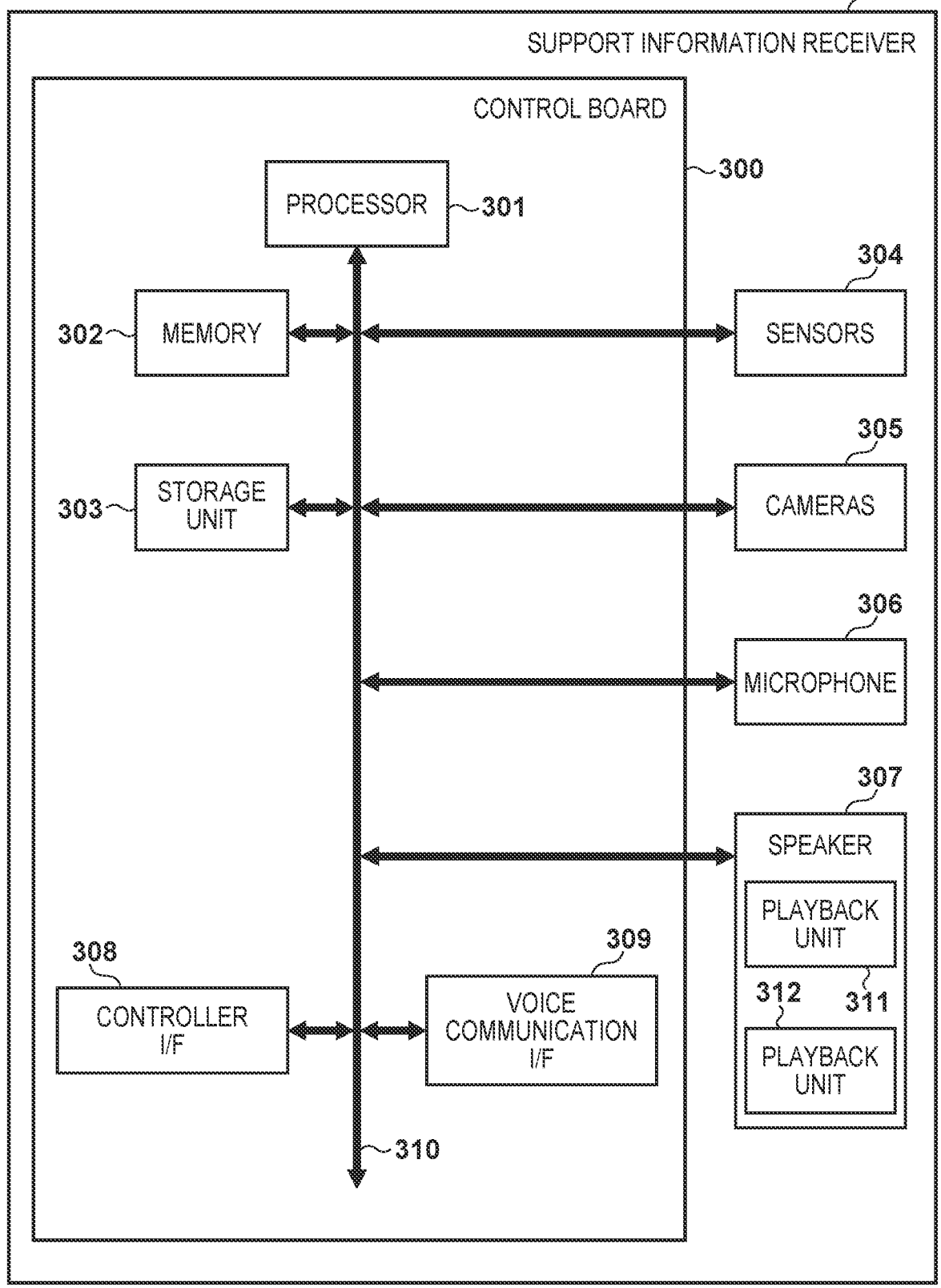
FIG. 3 is a view showing the block configuration of a helmet.

FIG. 3 is a view showing an example of the block configuration of the helmets 105 and 106. The helmets 105 and 106 include sensors and cameras for obtaining information representing the gestures of the riders and biological information of the riders. A camera 305 is installed in a portion that is inside the helmet and obliquely above the line of sight of the rider, and detects the line of sight and blink of the rider by images. Sensors 304 include a sensor for detecting the heart rate and body temperature of the rider. The sensors 304 are installed in, for example, cheek portions of the rider inside the helmet, so that the sensors 304 can easily touch the skin of the rider. The sensors 304 and the camera 305 for obtaining information representing the gesture of the rider and biological information of the ride are not limited to the above arrangements, and other arrangements can also be used. For example, the line of sight of the rider can also be detected by an eye tracking sensor for sensing a change in resistance value of the eye muscle, instead of the camera. In addition, a sensor for detecting the perspiration state of the rider can be configured by using a sensor capable of analyzing not only the heart rate and the body temperature but also the sweat component.

When using a four-wheeled automobile instead of the motorcycle 101 in this embodiment, it is also possible to obtain information representing the gesture of a passenger and biological information of the passenger by using a device such as a camera or a microphone. In this case, this device for obtaining the information representing the gesture and the biological information is installed on the dashboard, pillar, or roof in the vehicle.

The rider can hear a voice from the rider B riding on the motorcycle 101 and a voice guidance transmitted from the information transmitter 107, from a speaker 307 via a voice communication interface (I/F) 309. As the speaker 307, playback units 311 and 312 are formed in positions corresponding to the two ears of the rider. The playback unit 311 outputs the voice of the other rider, and the playback unit 312 outputs the voice guidance from the information transmitter 107. The rider can also have conversation with the other rider via a microphone 306 and the voice communication I/F 309. The microphone 306 and the speaker 307 are configured as, for example, an intercom.

A controller I/F 308 operates as an interface for communicating with the information transmitter 107, and transmits, for example, imaging data from the camera 305 and sensor signals from the sensors 304 to the information transmitter 107. Note that this communication between the controller I/F 308 and the information transmitter 107 can be performed by either wireless communication or wired communication.

A control board 300 is formed in, for example, the interior of each of the helmets 105 and 106. A processor 301, a memory 302, a storage unit 303, the controller I/F 308, and the voice communication I/F 309 are formed on the control board 300, and are connected via a bus 310 so as to be able to communicate with each other. The processor 301 can comprehensively control these blocks shown in FIG. 3 by reading out a program stored in the storage unit 303 to the memory 302 and executing the program.

Figure 4:
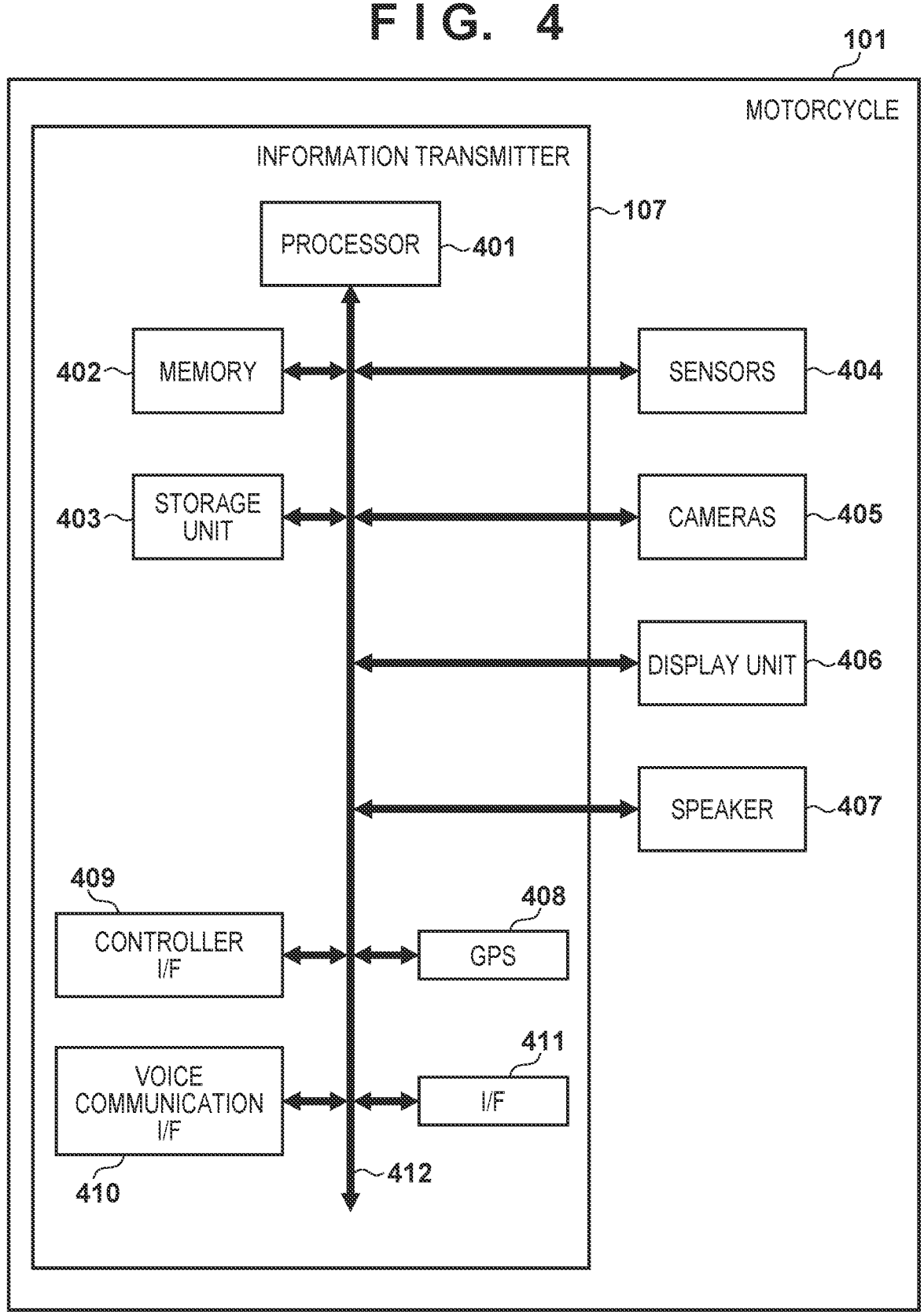
FIG. 4 is a view showing the block configuration of a controller.

FIG. 4 is a view showing an example of the block configuration of the information transmitter 107. The information transmitter 107 can be formed as a unit different from a controller including an ECU of the motorcycle 101, and can also be formed as a part of the controller. Sensors 404 are pressure sensors that are dispersedly installed on the seat of the motorcycle 101 and detect the motion of the rider. The sensors 404 can also include a sensor capable of detecting the heart rate and body temperature of the rider from the handle bars of the motorcycle 101. A camera 405 is installed near the handle bars and captures a face image of the rider. A display unit 406 is a display panel or the like and displays mapping information, a guidance screen, and the like. A speaker 407 outputs a voice guidance. This voice guidance can selectively be supplied to the speakers 307 of the helmets 105 and 106 or the speaker 407 of the motorcycle 101. The setting for this selection can be performed in a setting screen displayed on the display unit 406, and can also be switched by a hard switch. A GPS (Global Positioning System) 408 is a GPS oscillator and used to obtain position information of the motorcycle 101.

A controller I/F 409 operates as an interface for communicating with the helmets 105 and 106. A voice communication I/F 410 operates as an interface for performing voice communication with the helmets 105 and 106. An I/F 411 operates as an interface for communicating with the wireless communication apparatus 102.

The blocks of the information transmitter 107 shown in FIG. 4 include a processor 401, a memory 402, and a storage unit 403, and are connected via a bus 412 so as to be able to communicate with each other. The processor 401 can comprehensively control the blocks on the control board by reading out a program stored in the storage unit 403 to the memory 402 and executing the program. For example, the processor 401 controls each block on the control board by cooperating with the ECU of the motorcycle 101. The processor 401 can also execute an algorithm to be used as an AI (Artificial Intelligence). In the following explanation, processing capable of using an algorithm of an AI such as analogical processing can be implemented by the processor 401, and can also be implemented by network communication and the arithmetic apparatus 109.

Figure 5:
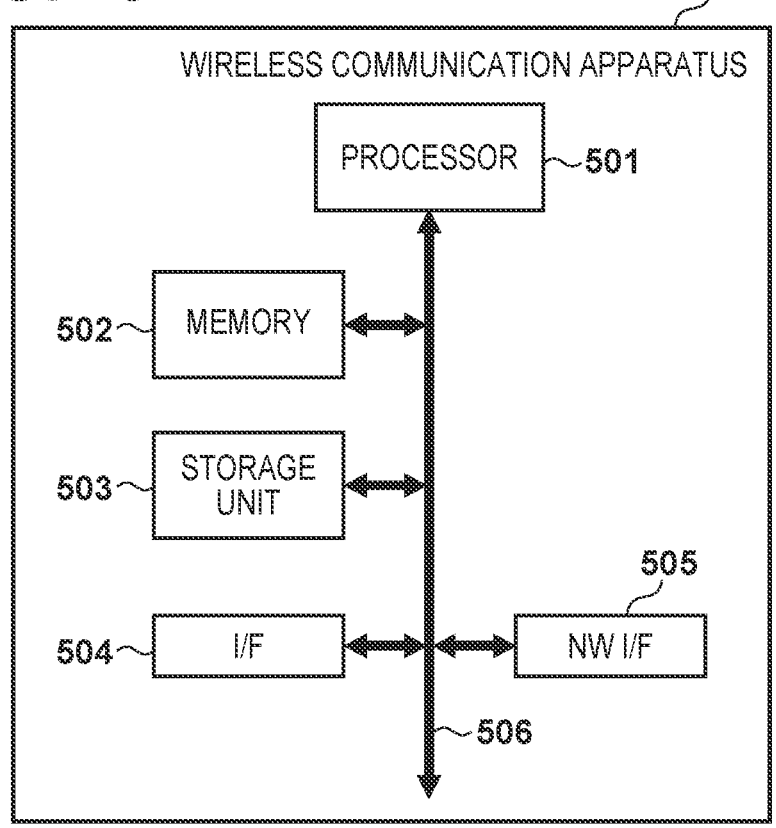
FIG. 5 is a view showing the block configuration of a wireless communication apparatus.

FIG. 5 is a view showing an example of the block configuration of the wireless communication apparatus 102. An I/F 504 operates as an interface for communicating with the information transmitter 107. A network (NW) I/F 505 operates as an interface for communicating with the server 104 across the network 103.

The blocks shown in FIG. 5 include a processor 501, a memory 502, and a storage unit 503, and are connected via a bus 506 so as to be able to communicate with each other. The processor 501 comprehensively controls the wireless communication apparatus 102 by reading out a program stored in the storage unit 503 to the memory 502, and executing the program. For example, the processor 501 exchanges communication protocols with the information transmitter 107, and exchanges communication protocols with the server 104.

Figure 6:
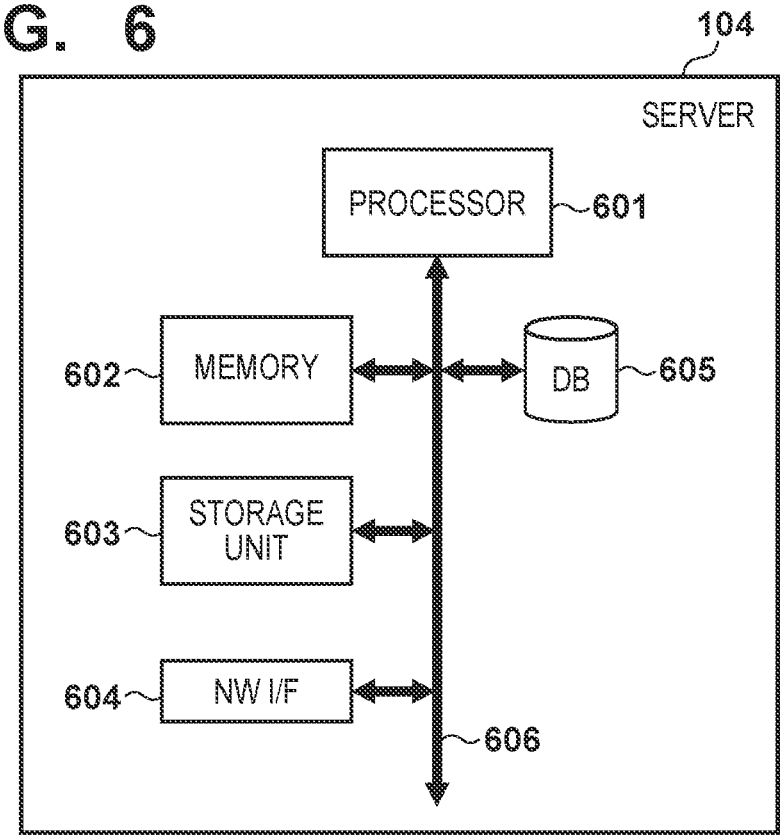
FIG. 6 is a view showing the block configuration of a server.

FIG. 6 is a view showing an example of the block configuration of the server 104. An NW I/F 604 operates as an interface for communicating with the wireless communication apparatus 102 across the network 103. A database (DB) 605 corresponds to the information storage unit 108 shown in FIG. 1, and stores personal attribute information corresponding to an individual capable of enjoying services of the behavior support system 100. In this embodiment, the DB 605 corresponds to the riders A and B. The DB 605 will be described later.

The blocks shown in FIG. 6 include a processor 601, a memory 602, and a storage unit 603, and are connected via a bus 606 so as to be able to communicate with each other. The processor 601 comprehensively controls the server 104 by reading out a program stored in the storage unit 603 to the memory 602 and executing the program. Also, the processor 601 can execute an algorithm to be used as an AI.

An example of the DB 605 according to this embodiment will be explained below. The middle portion of FIG. 16 shows an example of the DB 605. The DB 605 can be used not only to hold fixed information unique to the user such as the sex, age, and name of each rider, but also to derive uncertain information representing the taste and the preference. The information representing the taste and the preference is not limited to contents set by the rider himself or herself, but includes data obtained by analogy from information generated on a daily basis.

For example, the DB 605 can cooperate with a database for storing words found on the Internet from a portable terminal or a PC by an individual. The processor 601 of the server 104 obtains search words and search information of the user one by one from the database, and categorizes them. For example, this categorization sets categories by analyzing news stories and the like searched for by the search words. For example, as a result of analysis of news stories (for example, hot spring information and soybean curd) referred to by using "Kyoto" as a search word, "travel" and "food" are set as the categories of the news stories. Categories are not fixed, and a new category is extracted from the analytical result of a news story whenever a new search word is stored.

The processor 601 of the server 104 can execute various analogical processes and learnings from the category results as described above. For example, from categories "travel", "sports", and "food" having large numbers of times of search and the analysis of the search information, the preference of an individual corresponding to the database is reasoned by analogy like "active but prefers light food, and totally health-conscious". As a consequence, it is sometimes possible to derive a preference not realized by the individual himself or herself.

As shown in FIG. 16, a big database corresponding to an individual is constructed in the DB 605. In this embodiment, the behavior support system 100 refers to the DB 605 based on words frequently appearing in the conversation between the riders A and B, and learns favorite information of each rider. For example, when a word frequently appearing in the conversation is "movie", the behavior support system 100 refers to the DB 605, and learns that "movie XYZ" having the largest number of times of search is favorite information. Then, the behavior support system 100 provides guidance information to the riders A and B based on the favorite information.

As described above, the processor 601 can obtain information indicating the taste and preference of the individual by learning by using the DB 605. The processor 601 may also learn the tendency of the individual by using other information stored in the DB 605. For example, the processor 601 may also learn the lifestyle such as the sleeping hours by using date/time information or the like attached to a search word. Furthermore, if the DB 605 can cooperate with a database of a mobile phone system, the processor 601 can learn the lifestyle from blog information or the like of the individual.

In addition, the degree of correlation between categories can be determined in accordance with the number of search words contained in the categories. As shown in FIG. 16, each search word shows "the number of times of search/the total number of times of search of the category", and the degree of correlation between categories can be determined based on the total number of times of search. The processor 601 can learn the tendencies of the taste and preference of an individual by using the correlation like this.

An example of the DB 605 has been explained by using FIG. 16. However, another arrangement can also be used instead of the arrangement as shown in FIG. 16, if it is possible to learn the taste and preference of an individual. For example, a source for obtaining information is not limited to a search word as described above, and the abovementioned learning can also be performed based on setting data input beforehand from the rider to the server 104.

Also, information generated on a daily basis and contained in attribute information of the user (rider) can be obtained from information such as Internet search information other than information intentionally input by the user. By obtaining information like this, all products having an IoT (Internet of Things) function around the user become information sources, and information is stored in the DB 605 as personal attribute information of the user. For example, by obtaining information from a television having the IoT function owned by the user, it is possible to know by analogy that the user is sleep-deprived because he or she was watching a late-night show last night. It is also possible to know by analogy that the user is not healthy by obtaining information from a thermometer or sphygmomanometer having the IoT function. Furthermore, by obtaining information from a refrigerator having the IoT function, a favorite drink or food of the user can be known by analogy. A product having the IoT function as described above desirably has a function capable of automatically specifying the user by, for example, face recognition, a voice, or a fingerprint. When the user of this embodiment uses an IoT product capable of specifying the user, it is possible to improve the accuracy of guidance information and diversify the contents of the information by obtaining information to be presented below as personal attribute information.

The way of use, character, habit, and the like of the user using a product.

The health condition and the like of the user using a product.

The feeling, mental state, taste, and the like of the user using a product.

The physical ability, vehicle driving skill, and the like of the user using a product.

Figure 7:
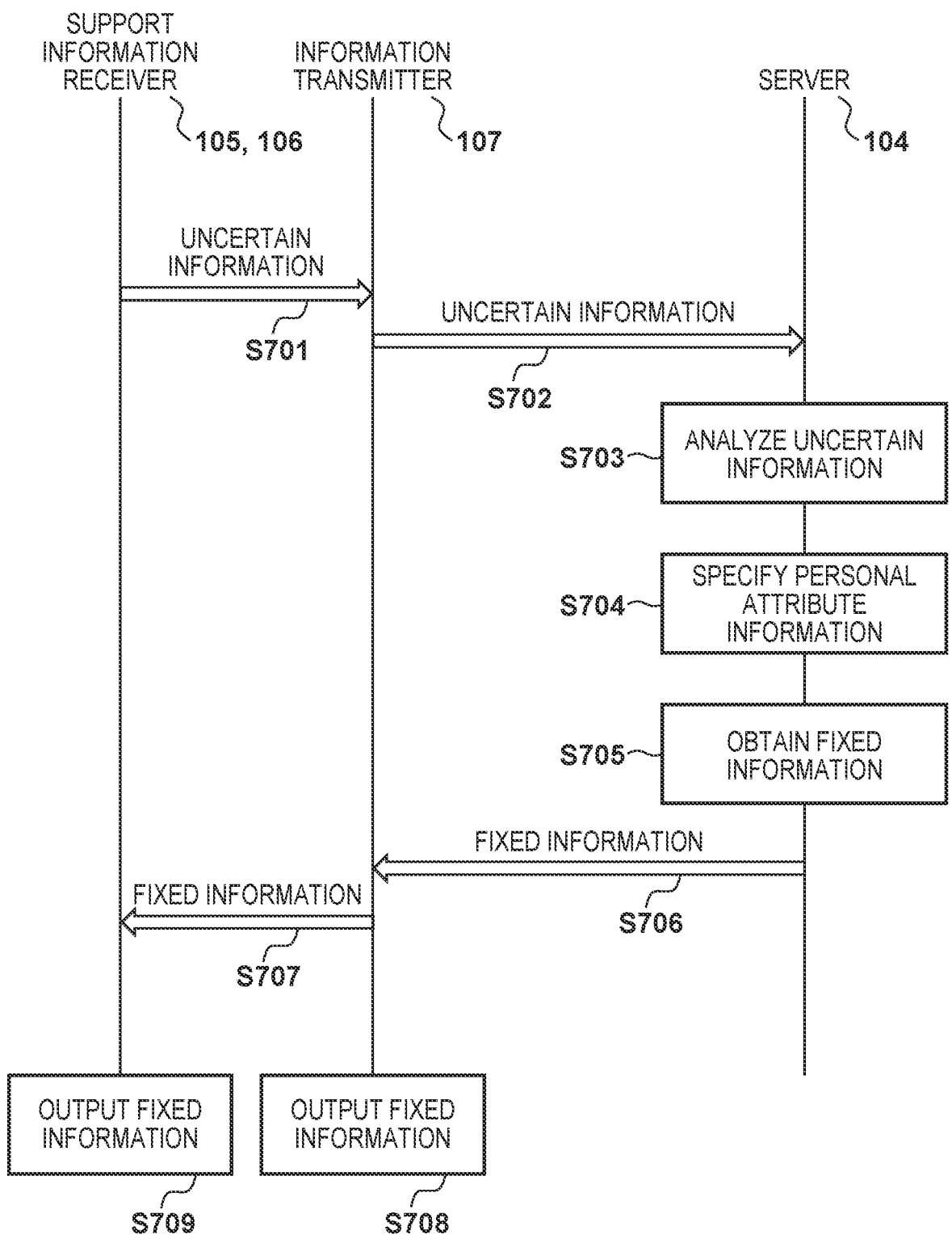
FIG. 7 is a view showing the processing sequence of the support system.

FIG. 7 is a view showing the processing sequence of the behavior support system 100 according to this embodiment. Assume that the riders A and B are riding on the motorcycle 101 and can enjoy services of the behavior support system 100. For example, when the riders A and B turn on the power supplies of the helmets 105 and 106, the information transmitter 107 transmits activation information of the helmets 105 and 106 and driving information of the motorcycle 101 to the server 104 via the wireless communication apparatus 102. When receiving these pieces of information, the server 104 starts providing the services of the behavior support system 100 to the motorcycle 101.

The riders A and B can perform voice communication with each other by the microphones 306 and the speakers 307. Assume that the rider A is wearing the helmet 105 and the rider B is wearing the helmet 106. Note that FIG. 7 does not show the wireless communication apparatus 102 for relaying data.

First, in step S701 ("step" will be omitted hereinafter), the helmets 105 and 106 transmit uncertain information to the information transmitter 107. The uncertain information transmitted in S701 contains voice signals of the riders A and B, imaging data from the cameras 305, and sensor signals from the sensors 304. In S702, the information transmitter 107 transmits the uncertain information to the server 104. This uncertain information transmitted in S702 contains imaging data from the camera 405 and sensor signals from the sensors 404 of the motorcycle 101, in addition to the uncertain information transmitted from the helmets 105 and 106. The uncertain information transmitted in S702 also contains driving information of the motorcycle 101. The driving information is speed information of the motorcycle 101.

In S703, the server 104 analyzes the uncertain information transmitted from the information transmitter 107. The server 104 analyzes voice signals received over a predetermined time, for example, 30 min, and extracts a frequently appearing word. Assume that a frequently appearing word from all the voice signals of the riders A and B is "movie".

A frequently appearing word can be extracted by various methods. For example, it is possible to extract, as a frequently appearing word, a voice word that not only has a high appearance frequency but also contains a high-frequency component in a predetermined region, which is obtained by analyzing the spectrum of a voice signal. It is also possible to extract, as a frequently appearing word, a voice word having a predetermined amplitude or more that is obtained by analyzing the amplitude of a voice signal. Furthermore, it is also possible to analyze the rhythm of a voice signal, and extract a frequently appearing word in a period during which the tempo is a predetermined tempo or higher. With these configurations, it is possible to take account of the volumes, tones, and intervals of voices when the riders A and B are having a lively conversation. This makes it possible to improve the accuracy of the process of extracting, as a frequently appearing word, a word in which both the riders are probably interested.

In S704, the server 104 analyzes data of the DB 605 of each of the riders A and B, and learns favorite information of each of the riders A and B in the category "movie". In the example shown in FIG. 16, the server 104 learns "movie XYZ", which represents a movie title and has the largest number of times of search in the category of the frequently appearing word "movie", as favorite information. Then, the server 104 specifies favorite information common to the riders A and B. In this embodiment, the specified common favorite information is regarded as personal attribute information, and the personal attribute information in this case is "movie XYZ".

In S705, the server 104 obtains fixed information on "movie XYZ". This fixed information in the behavior support system 100 serves as support information for supporting the behavior of a passenger. The fixed information on "movie XYZ" is, for example, sequel information on "movie XYZ". This fixed information may also be information in a higher rank among the results of search performed by the server 104 about "movie XYZ" on the Internet. The server 104 can also specify information of a category not held in the DB 605 of each of the riders A and B, among the results of search on the Internet, and obtain the information as fixed information. This makes it possible to provide information that is perhaps not recognized by the riders A and B at that point of time. Assume that the fixed information specified in S704 contains "movie XYZ2" and its release date.

In S706, the server 104 transmits the obtained fixed information to the information transmitter 107 of the motorcycle 101. This fixed information may also be data to be displayed on the display unit 406 of the motorcycle 101. In this case, in S708, the information transmitter 107 can display a message like "By the way, the scheduled release date of "movie XYZ2" to be released anew is ×××" on the display unit 406.

Alternatively, the fixed information transmitted in S706 can be voice data. In this case, in S707, the information transmitter 107 converts voice data received from the server 104 into a voice signal that can be played back by the speakers 307 of the helmets 105 and 106, and transmits the voice signal to the helmets 105 and 106. Then, in S709, the helmets 105 and 106 play back the above message as a voice guidance from the speakers 307. Also, if the fixed information transmitted in S706 is voice data, the voice data can also be played back by the speaker 407 of the information transmitter 107. In the above explanation, the fixed information is output as a voice guidance to the speakers 307 of the helmets 105 and 106. However, the fixed information may also be displayed on the shield portion of each of the helmets 105 and 106. The fixed information may also be output by another output method. For example, it is also possible to form a spray hole for spraying a gas containing a predetermined component in each of the helmets 105 and 106, and spray the gas toward the rider. For example, when outputting the fixed information, communication between the riders can be supported better by spraying a favorable scent from the spray holes.

In addition, when using a four-wheeled automobile instead of the motorcycle 101 in this embodiment, the voice guidance can be played back by a speaker in the vehicle. In this case, it is possible to use, as the speaker, a parametric speaker capable of selectively outputting a sound to a person within a narrow range, and selectively output a sound to a person as a guidance playback target. The fixed information may also be output by another output method. For example, the fixed information may also be displayed on the windshield of a vehicle. It is also possible to form a spray hole for spraying a gas containing a predetermined component in a vehicle, and spray the gas toward a passenger. For example, when outputting the fixed information, communication between passengers can be supported better by spraying a favorable scent from the spray hole.

The processor 601 of the server 104 can also form the message as described above based on the analytical results of the voice signals of the riders A and B in S703, for example, the tones and intervals of the voice signals. For example, a message indicating the way of interrupting conversations can be changed in accordance with intervals between the conversations.

Figure 8:
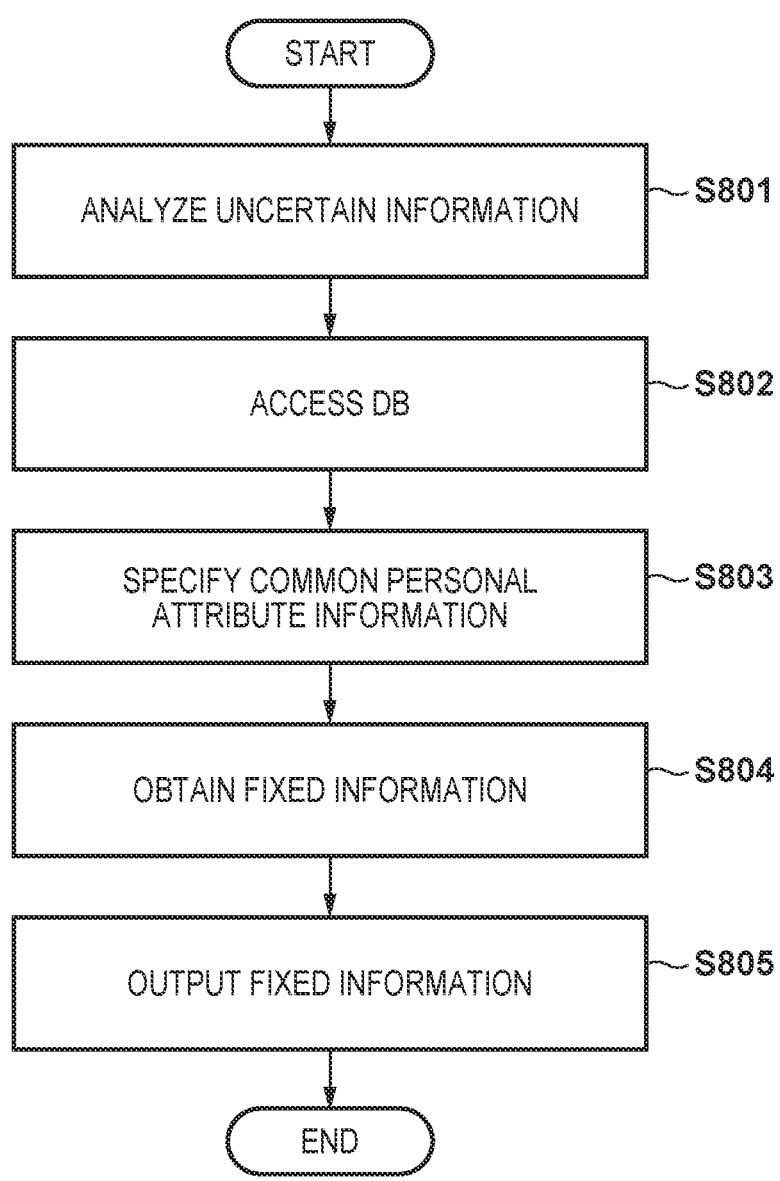
FIG. 8 is a flowchart showing a process of outputting fixed information.

FIG. 8 is a flowchart showing the process of outputting the fixed information. This process shown in FIG. 8 corresponds to S703 to S705 in FIG. 7. In the explanation of FIG. 7, the server 104 executes the processes in S703 to S705. In this case, the information transmitter 107 of the motorcycle 101 need not execute complicated algorithms for big database analysis, learning, and the like, so the processing load on the information transmitter 107 reduces. As will be explained below, however, the motorcycle 101 may also execute at least some of the processes in S703 to S705.

In S801, the processor 401 analyzes uncertain information. For example, the processor 401 analyzes voice signals transmitted from the helmets 105 and 106, and extracts a frequently appearing word.

In S802, the processor 401 accesses the DB 605 corresponding to the riders A and B. Assume that the DB 605 is the DB 605 of the server 104 configured as a cloud. Note that in the server 104, the processor 601 patterns data of the DB 605 to data shown in the middle portion of FIG. 16, not in synchronism with the processing of the information transmitter 107 of the motorcycle 101. For example, the processor 601 of the server 104 can periodically hold the results of data analysis and learning as patterned data. With this configuration, the processor 401 of the information transmitter 107 can improve the response to the riders A and B, although the results of learning cannot be obtained in real time.

The processor 401 obtains the patterned data from the DB 605, and obtains favorite information of each rider based on the frequently appearing word extracted in S801. In S803, the processor 401 learns the favorite information of the riders A and B, and specifies common favorite information as personal attribute information. Assume that "movie XYZ" is specified as the personal attribute information.

In S804, the processor 401 obtains fixed information on "movie XYZ". This fixed information is obtained by the method as explained in FIG. 7. In S805, the processor 401 outputs the obtained fixed information to the speaker 407 or the display unit 406 of the information transmitter 107, or to the speakers 307 of the helmets 105 and 106.

When outputting the fixed information in S805, the processor 401 forms a message by the method explained in FIG. 7. In the explanation of FIG. 7, a message is formed in accordance with the analytical results of voice signals. However, a message may also be formed by taking account of not only the voice signals but also other uncertain information. For example, the processor 401 performs a determination of the expression on face images from the cameras 305 of the helmets 105 and 106 which the riders A and B are wearing. The processor 401 can form a message by reasoning human feelings by analogy based on the determination result, for example, the result of the determination of a smiling face.

As shown in FIG. 8, the response to the riders A and B can be improved when the motorcycle 101 analyzes the uncertain information, and the information transmitter 107 obtains the patterned data having undergone the analysis and learning of the data of the DB 605. In addition, even when the communication between the information transmitter 107 and the server 104 is disconnected by some cause after the information transmitter 107 obtains the patterned data, the processor 401 of the information transmitter 107 can specify the common personal attribute information and obtains the fixed information based on the obtained data.

In this embodiment as described above, appropriate guidance information is provided for the riders A and B based on the conversation between the riders A and B. Also, this guidance information is developing information related to the common favorite information of the riders A and B, so the conversation between the riders A and B can further be developed.

Second Embodiment

In the first embodiment, the behavior support system 100 that provides the riders A and B with appropriate guidance information as a voice or display data based on the conversation between the riders A and B has been explained. In this embodiment, a behavior support system 100 that provides riders A and B with appropriate guidance information as a voice or display data if the result of analysis of the conversation between the riders A and B determines that there is a speechless state will be explained by explaining differences from the first embodiment.

This embodiment will be explained with reference to FIG. 7. S701 and S702 are the same as in the explanation of the first embodiment. In S703, a server 104 analyzes uncertain information transmitted from an information transmitter 107. In this embodiment, the server 104 extracts a silent period from voice signals received from the riders A and B. Then, the server 104 determines whether there is a silent period satisfying a predetermined condition. The predetermined condition is, for example, a silent period of two minutes. Subsequently, the server 104 determines by analogy whether the cause of this silent period of the predetermined time is a speechless state, based on other uncertain information, for example, the face images or the lines of sight of the riders A and B. Note that "a speechless state" herein mentioned means a speechless state caused because the conversation does not continue.

If the server 104 determines by analogy that the cause of the silent period is a speechless state, the process advances to S704, and the server 104 analyzes data of a DB 605 of each of the riders A and B, and learns favorite information of each of the riders A and B. Then, the server 104 specifies favorite information common to the riders A and B. In this embodiment, it is assumed that the specified common favorite information (personal attribute information) is "movie XYZ". For example, common favorite information "movie XYZ" having relatively large numbers of times of search for both the riders A and B is specified.

In S705, the server 104 obtains fixed information on "movie XYZ" in the same manner as in the first embodiment. Processing from S706 is the same as that in the explanation of the first embodiment.

Even when it is determined that there is a silent period of two minutes from the voice signals of the riders A and B, various reasons are possible as the cause of this silent period. An example of the cause is that the rider B is sleeping.

In this embodiment, the server 104 determines by analogy whether the cause of the silent period is a speechless state, based on the uncertain information transmitted from the information transmitter 107. For example, the server 104 analyzes the face image and the line of sight of the rider B, as analogical criteria. For example, if it is detected by the result of analysis that the eyes of the rider B have been closed for a predetermined time, the server 104 determines by analogy that the cause of the silent period is that the rider B is sleeping. Also, if it is detected by the result of analysis that, for example, the rider B is yawning and obliquely looking down for a predetermined time, the server 104 determines by analogy that the cause of the silent period is a speechless state.

In addition to determining by analogy whether there is a speechless state in accordance with the fixed criteria as described above, the server 104 can also perform scoring corresponding to the weight of each of a plurality of criteria, and determine by analogy whether there is a speechless state based on the scores. For example, it is possible to use "analytical information of the face image of the rider B" and "biological information of the rider B" as the plurality of criteria. In this case, the analytical information of the face image of the rider B contains information such as the angle of the mouth and the line of sight, and these pieces of information are weighted. Scoring representing the degree of speechless is performed based on a predetermined state of the face image, a predetermined state of the line-of-sight information, and the like. Also, the biological information of the rider B contains the perspiration state, the body temperature, the heart rate, and the like, and these pieces of information are weighted. Storing representing the degree of speechless is performed based on predetermined states of these pieces of information. The server 104 can also change the abovementioned weightings one after another by analyzing the data of the DB 605. For example, if the server 104 finds by analogy the tendency that the rider B likes outdoor activities, by analyzing the data, for example, the categories of the DB 605 of the rider B, the server 104 determines that the rider B tends to strongly show feelings on the expressions, and hence raises the weighting of the analytical information of the face image of the rider B.

Figure 9:
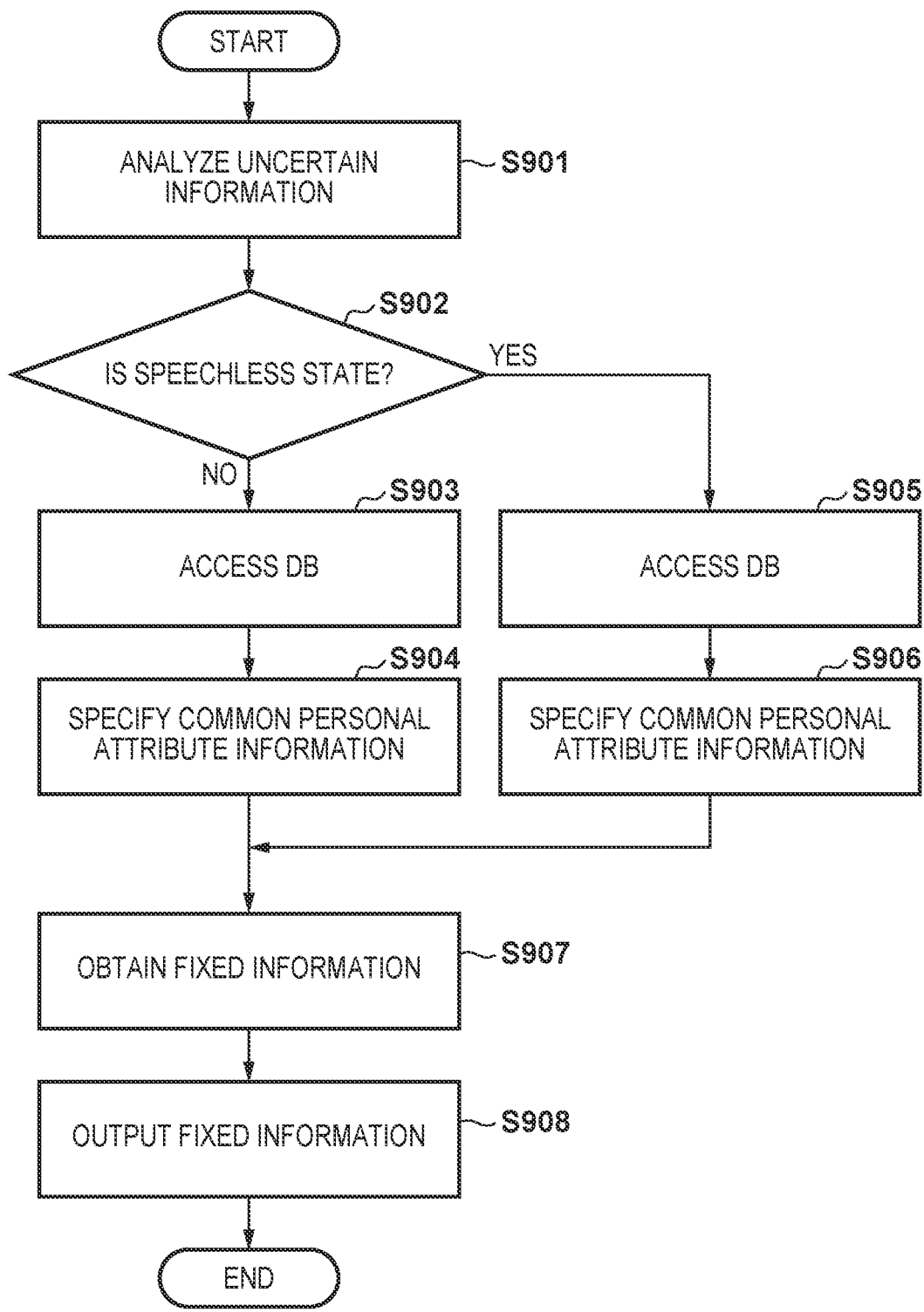
FIG. 9 is a flowchart showing a process of outputting fixed information.

FIG. 9 is a flowchart showing the process of outputting fixed information according to this embodiment. This process shown in FIG. 9 corresponds to S703 to S705 in FIG. 7. As will be explained later, a motorcycle 101 can perform at least some of the processes in S703 to S705, in this embodiment as well.

In S901, a processor 401 analyzes uncertain information and detects a silent period. For example, the processor 401 detects a silent period meeting a predetermined condition based on voice signals transmitted from helmets 105 and 106. In S902, the processor 401 determines by analogy whether the cause of the silent period is a speechless state, based on uncertain information transmitted from the helmets 105 and 106, sensors 404, and a camera 405.

If it is not determined by analogy in S902 that the cause of the silent period is a speechless state, the process advances to S903. Processes in S903, S904, S907, and S908 are the same as those in the explanation of S802, S803, S804, and S805 in FIG. 8.

If it is determined by analogy in S902 that the cause of the silent period is a speechless state, the process advances to S905. In S905, the processor 401 accesses the DB 605 corresponding to the riders A and B. The DB 605 herein mentioned is the DB 605 of the server 104 constructed as a cloud. Note that a processor 601 of the server 104 has patterned the data of the DB 605 to the data shown in the middle portion of FIG. 16, not in synchronism with the processing of the information transmitter 107 of the motorcycle 101. For example, the processor 601 of the server 104 can periodically hold the results of data analysis and learning as patterned data. With this configuration, the processor 401 of the information transmitter 107 can improve the response to the riders A and B, although the results of learning cannot be obtained in real time.

In S906, the processor 401 obtains the patterned data from the DB 605, learns favorite information of the riders A and B, and specifies common favorite information as personal attribute information. Assume that "movie XYZ" is specified as the common personal attribute information. After S906, the process advances to S907. Processes in S907 and S908 are the same as those in the explanation of S804 and S805 in FIG. 8.

In this embodiment as described above, if a speechless state of the conversation between the riders A and B is detected, appropriate guidance information is provided for the riders A and B. Also, this guidance information is developing information related to the common favorite information of the riders A and B, so a subject of a developing conversation can be provided for the riders A and B.

Third Embodiment

In the first embodiment, the behavior support system 100 that provides the riders A and B with an appropriate guidance by a voice or display data based on the conversation between the riders A and B has been explained. In the second embodiment, the behavior support system 100 which detects a speechless state of the conversation between the riders A and B and provides a developing conversation subject to the riders A and B has been explained. In this embodiment, a behavior support system 100 that analyzes the conversation between riders A and B and provides the rider A with information that is favorite information of the rider B but is probably not recognized by the rider B at that point of time will be explained by explaining differences from the first and second embodiments.

This embodiment will be explained with reference to FIG. 7. S701 to S703 are the same as those in the explanation of the first embodiment. Assume that a frequently appearing word from all voice signals of the riders A and B in S703 is "movie".

In S704, a server 104 analyzes data of a DB 605 of the rider B, and learns favorite information of the rider B in the category "movie". Then, the server 104 specifies information not existing in the DB 605 of the rider B but existing in the DB 605 of the rider A in relation to, for example, "movie XYZ". For example, the server 104 specifies a word that is contained in a category not existing in the DB 605 of the rider B but existing in the DB 605 of the rider A, and appears in a news story found by "movie XYZ" on the Internet. For example, the server 104 specifies a location "EFG town" of "movie XYZ".

In the above explanation, the frequently appearing word "movie" is extracted from all the voice signals of the riders A and B in S703. However, a movie title "XYZ" may also be extracted from questions and answers between the riders A and B. For example, when the rider A asks "What movie did you see recently?" and the rider B answers "I saw movie XYZ", a word contained in a category, among categories containing "movie XYZ", which does not exist in the DB 605 of the rider B and exists in the DB 605 of the rider A, and appearing in a news story found on the Internet by "movie XYZ", is specified as personal attribute information.

The personal attribute information specified in S704 is not limited to the favorite information having a large number of times of search in the DB 605 of the rider A. For instance, in the above example, "EFG town" may be a place which has no relation to "movie XYZ" and which the rider A happened to visit for business. However, when the personal attribute information is specified under the abovementioned conditions, it is possible to provide the rider A with information that is familiar to the rider A and may become favorite information of the rider B but is not recognized by the rider B yet, that is, fresh information. In addition, providing the information to the rider A alone can make the rider B recognize "the rider A gave me fresh information".

In S705, the server 104 obtains fixed information on the location "EFG town", as in the first embodiment. For example, as this fixed information on "EFG town", the server 104 obtains information indicating that the town is the location of "movie XYZ", and position information.

When the fixed information is obtained as in the above example, the server 104 can transmit, in S706, navigation information as display data, together with a voice guidance, to an information transmitter 107, from the current position of a motorcycle 101 and the position information of "EFG town". An example of the voice guidance is "EFG town as the location of movie XYZ is ×× kilometers ahead". In S708, the information transmitter 107 displays the navigation information on a display unit 406 based on the display data.

In S707, the information transmitter 107 converts the voice data received from the server 104 into a voice signal that can be played back by a speaker 307 of a helmet 105 of the rider A, and transmits the voice signal to the helmet 105. In S709, the helmet 105 plays back the above message as a voice guidance from the speaker 307. When using a four-wheeled automobile in place of the motorcycle 101 in this embodiment, the message may also be played back from a speaker in the vehicle. In this case, it is possible to use, as the speaker, a parametric speaker capable of selectively outputting a sound to a person within a narrow range, and selectively output a sound to a person as a guidance playback target.

In this embodiment as described above, only the rider A is notified of the guidance information. With this configuration, it is possible to make the rider B aware that fresh information is received from the rider A. It is also possible to provide the rider A with information that is not recognized by the rider A himself or herself and may become favorite information of the rider B.

Figure 10:
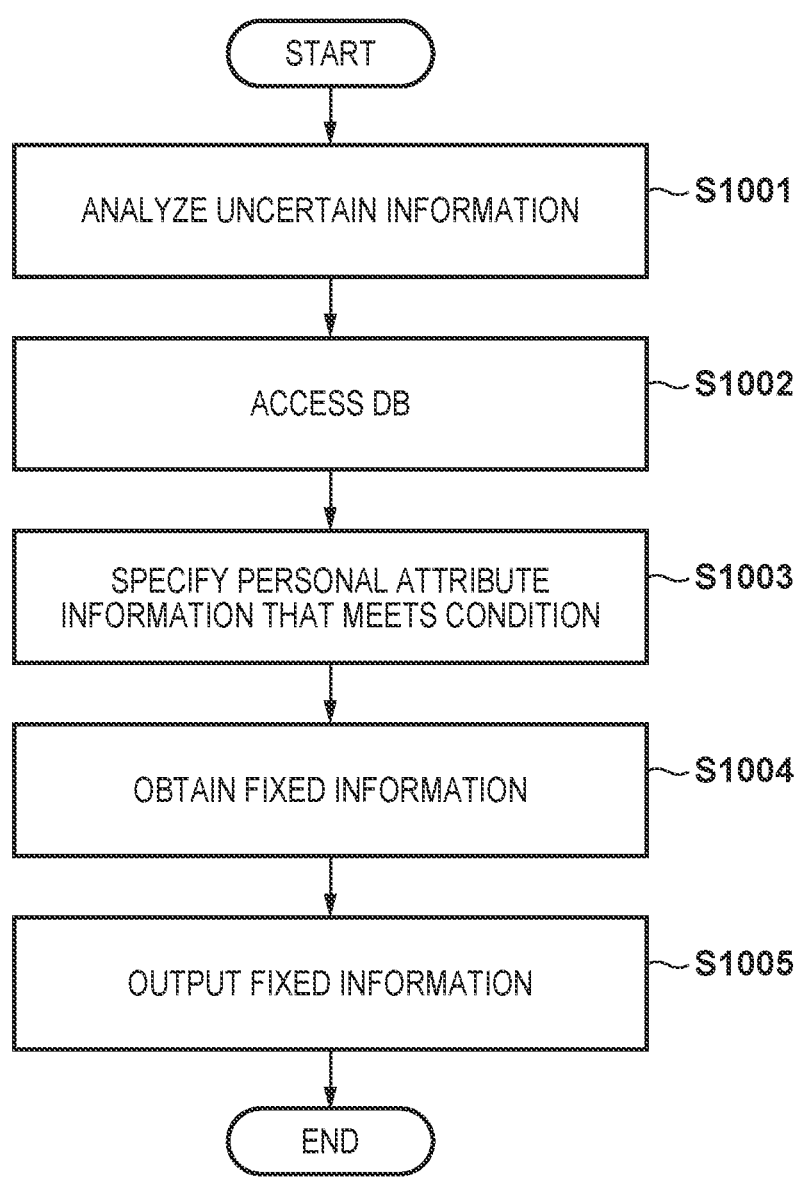
FIG. 10 is a flowchart showing a process of outputting fixed information.

FIG. 10 is a flowchart showing the process of outputting fixed information in this embodiment. The process shown in FIG. 10 corresponds to S703 to S705 in FIG. 7 of this embodiment. The motorcycle 101 can perform at least some of S703 to S705 as will be explained below, in this embodiment as well.

S1001 and S1002 are the same as S801 and S802 in FIG. 8. Assume that the DB 605 is the DB 605 of the server 104 configured as a cloud. Note that the processor 601 in the server 104 has patterned the data of the DB 605 to data shown in the middle portion of FIG. 16, not in synchronism with the processing of the information transmitter 107 of the motorcycle 101. For example, a processor 601 of the server 104 can periodically hold the results of data analysis and learning as patterned data. With this configuration, a processor 401 of the information transmitter 107 can improve the response to the riders A and B, although the results of learning cannot be obtained in real time.

In S1003, the processor 401 learns the favorite information of the rider B, and specifies personal attribute information meeting the condition as described above. Processes in S1004 and S1005 are the same as those in the explanation of S804 and S805 in FIG. 8, but the voice guidance is different from the explanation of FIG. 8 in that the guidance is output to only the speaker 307 of the helmet 105 of the rider A.

In this embodiment as described above, only the rider A is notified of the guidance information. With this configuration, it is possible to make the rider B recognize that fresh information is received from the rider A.

Fourth Embodiment

In the first embodiment, the behavior support system 100 that provides the riders A and B with appropriate guidance information as a voice of display data based on the conversation between the riders A and B has been explained. In the second embodiment, the behavior support system 100 that detects a speechless state of the conversation between the riders A and B and provides a developing conversation subject to the riders A and B has been explained. In the third embodiment, the behavior support system 100 that analyzes the conversation between the riders A and B and provides the rider A with information that is perhaps not recognized by the rider B at that point of time has been explained. In this embodiment, a behavior support system 100 that provides a rider A with a delicate subject such as a bad physical condition of a rider B as guidance information will be explained by explaining differences from the first to third embodiments.

Figure 11:
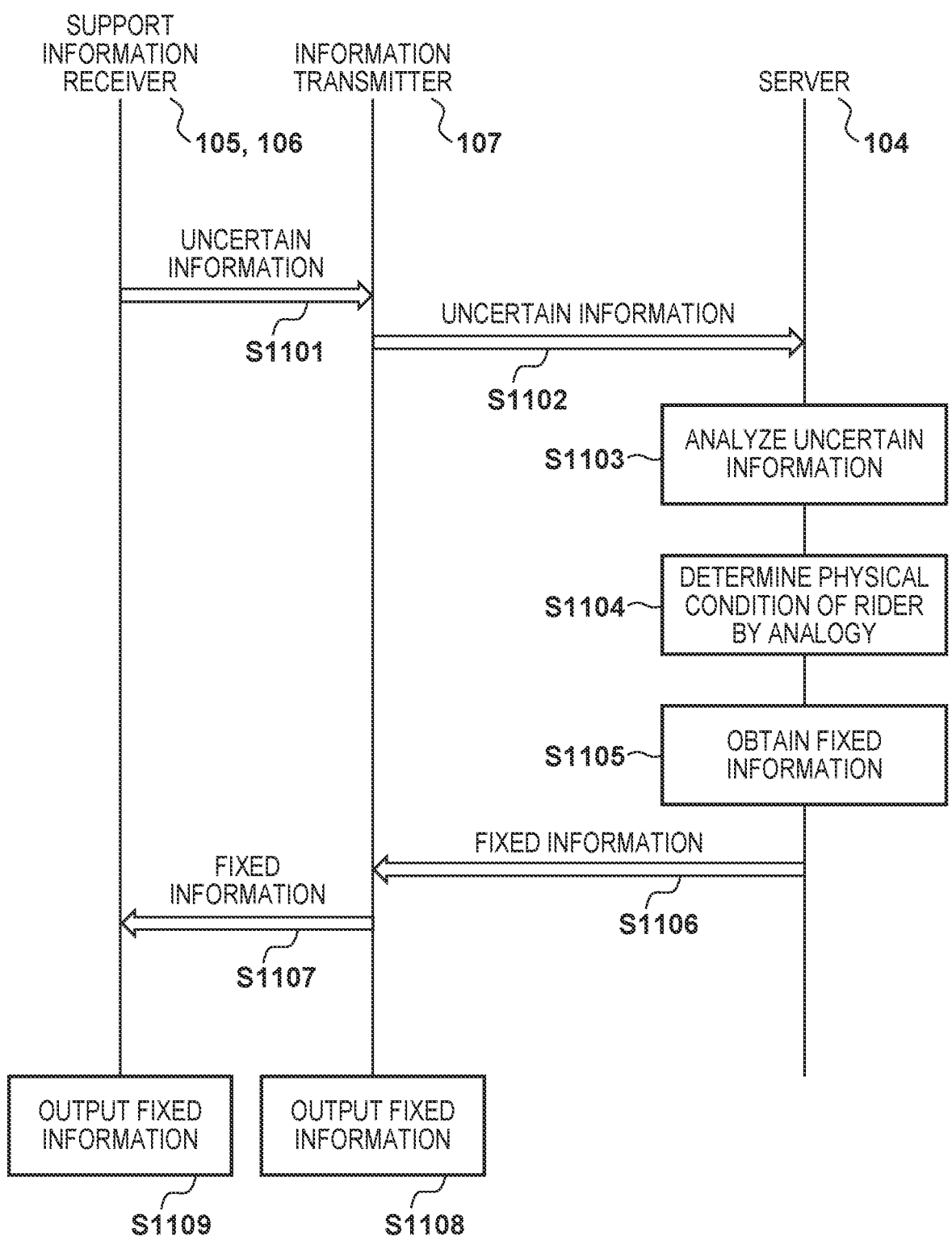
FIG. 11 is a view showing the processing sequence of a support system.

FIG. 11 is a view showing the processing sequence of the behavior support system 100 according to this embodiment. In S1101, helmets 105 and 106 transmit uncertain information to an information transmitter 107. This uncertain information transmitted in S1101 contains voice signals of the riders A and B, imaging data from cameras 305, and sensor signals from sensors 304. In S1102, the information transmitter 107 transmits the uncertain information to a server 104. The uncertain information transmitted in S1102 contains imaging data from a camera 405 of a motorcycle 101 and sensor signals from sensors 404, in addition to the uncertain information transmitted from the helmets 105 and 106. The uncertain information transmitted in S1102 also contains driving information of the motorcycle 101. The driving information is, for example, speed information of the motorcycle 101. In S1103, the server 104 analyzes the uncertain information transmitted from the information transmitter 107. In S1104, the server 104 determines the physical condition of the rider B by analogy based on the analytical result. In S1103, the server 104 collects uncertain information of the rider B, such as a voice signal, a face image, perspiration information, the body temperature, and the heart rate. Assume that the server 104 determines by analogy that the rider B has a desire to urinate.

In S1105, the server 104 obtains fixed information corresponding to the physical condition of the rider B determined by analogy in S1104. For example, the fixed information corresponding to the desire to urinate is position information of a nearby service area. This position information is obtained based on, for example, GPS position information of the motorcycle 101.

When the position information of the service area is obtained as the fixed information as in the above example, the server 104 transmits, in S1106, navigation information as display data together with a voice guidance to the information transmitter 107, from the current position of the motorcycle 101 and the position information of the service area. An example of the voice guidance is "There is a rest station ahead. Would you like to drop by?" In S1108, the information transmitter 107 displays the navigation information on a display unit 406 based on the display data.

In S1107, the information transmitter 107 converts the voice data received from the server 104 into a voice signal that can be played back by a speaker 307 of the helmet 105 of the rider A, and transmits the voice signal to the helmet 105. Then, in S1109, the helmet 105 plays back the above message as a voice guidance from the speaker 307. When using a four-wheeled automobile instead of the motorcycle 101 in this embodiment, the message can also be played back by a speaker in the vehicle. In this case, it is possible to use, as the speaker, a parametric speaker capable of selectively outputting a sound to a person within a narrow range, and selectively output a sound to a person as a guidance playback target.

In this embodiment as described above, only the rider A is notified of the guidance information. With this configuration, it is possible to make the rider A recognize a delicate subject of the rider B without being noticed by the rider B.

This example uses, for example, a method to be explained below in order to reason by analogy that the rider B has a bad physical condition. The server 104 detects that the physical condition of the rider B is not normal from a change in biological information such as perspiration information, the body temperature, and the heart rate. Then, the server 104 reasons the cause of the change in biological information of the rider B by analogy, based on other uncertain information such as a voice signal and a face image.

For example, the server 104 reasons by analogy that the cause is a desire to urinate of the rider B, from information indicating the most recent stop at the service area and time information. It is also possible to dispersedly install pressure sensors on a rear seat on which the rider B sits, and reason by analogy that the cause is a desire to urinate of the rider B based on the abovementioned information and a change in physical tension of the rider B. Alternatively, the server 104 can also obtain information of LINE or the blog of the rider B in the DB 605, and reason by analogy that the cause is a desire to urinate of the rider B based on the abovementioned information and eat/drink information of the rider B.

In addition to the reasoning by analogy of the state in which the rider B has a desire to urinate, if a term such as "I feel sick" directly meaning a bad physical condition is detected by the analysis of a voice signal, the server 104 can preferentially reason by analogy that the rider B has a bad physical condition. Even when a term like this is not detected, it is possible to reason by analogy that the cause of the change in biological information described above is a bad physical condition of the rider B, based on changes in tone and interval of the voice of the rider B and a change in face image of the rider B, and obtain position information of a nearby service area.

Figure 12:
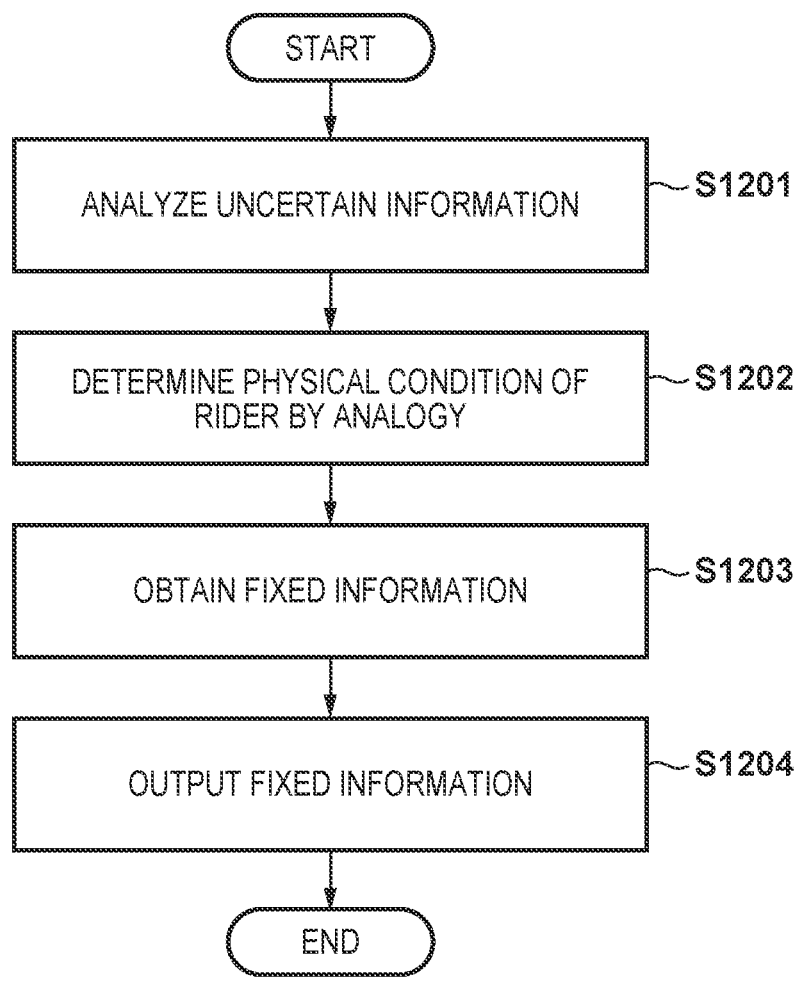
FIG. 12 is a flowchart showing a process of outputting fixed information.

FIG. 12 is a flowchart showing the process of outputting fixed information according to this embodiment. This process shown in FIG. 12 corresponds to S1103 to S1105 in FIG. 11. In this embodiment as will be explained below, the motorcycle 101 can perform at least some of the processes in S1103 to S1105.

In S1201, a processor 401 analyzes uncertain information transmitted from the helmets 105 and 106 and the motorcycle 101. Then, in S1202, the processor 401 reasons the physical condition of the rider B by analogy based on the analytical results. Assume that it is reasoned by analogy that the rider B has a desire to urinate.

In S1203, the processor 401 obtains fixed information corresponding to the physical condition of the rider B, which is reasoned by analogy in S1202. An example of the fixed information corresponding to the physical condition is position information of a service area. This position information can also be obtained based on, for example, GPS position information of the motorcycle 101. In S1204, the processor 401 displays the obtained fixed information on the display unit 406 and plays back the information from the speaker 307 of the helmet 105.

In this embodiment as described above, it is possible to make the rider A recognize a delicate subject such as a bad physical condition of the rider B, without being noticed by the rider B.

Fifth Embodiment

Figure 13:
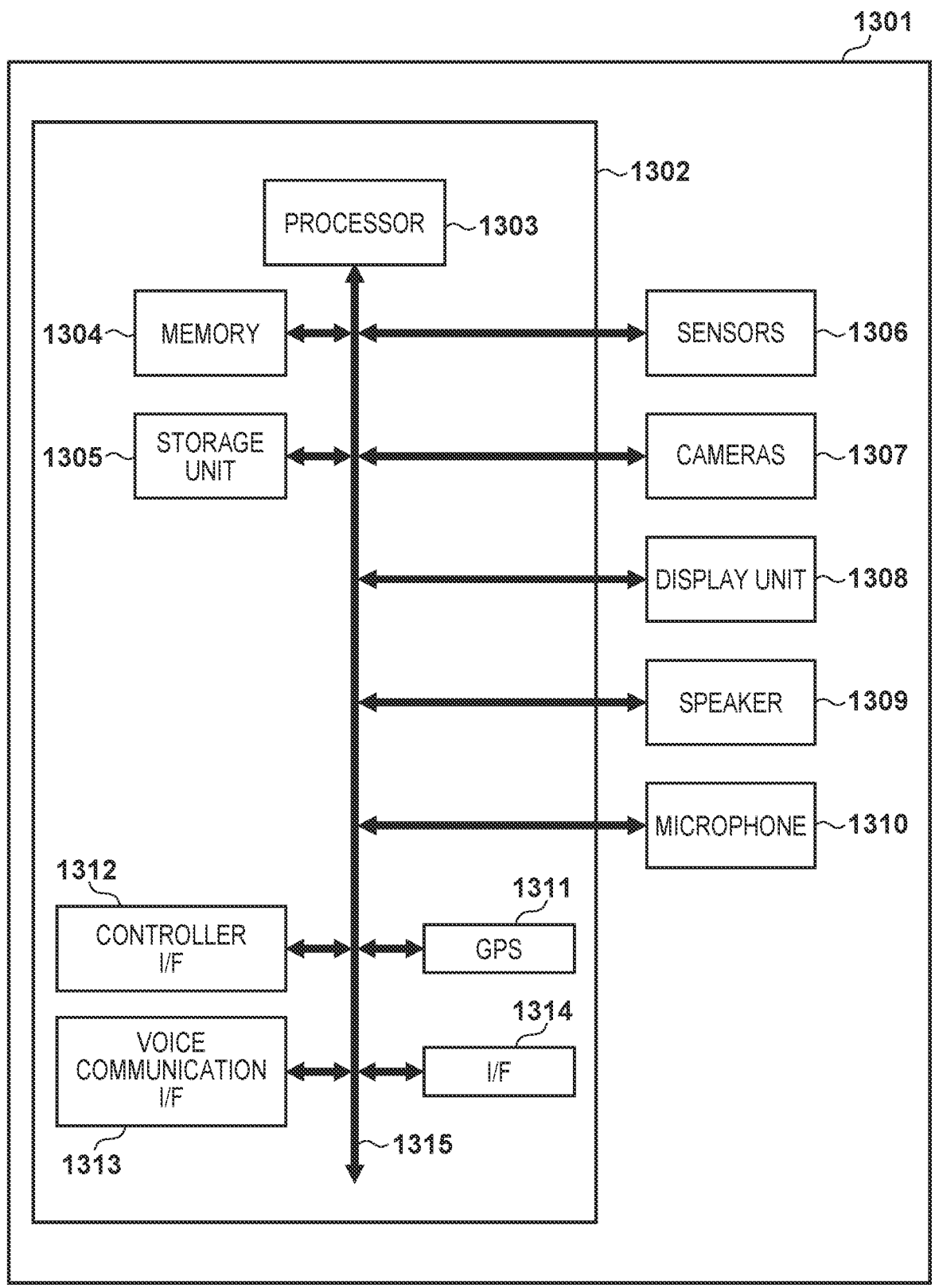
FIG. 13 is a view showing the block configuration of a controller.

The first to fourth embodiments have been explained as examples in which the riders A and B are riding on the motorcycle 101. In this embodiment, a form in which the information transmitter 107, the sensors 404, the camera 405, the display unit 406, and the speaker 407 shown in FIG. 4 are installed in an automobile will be explained. FIG. 13 is a view showing the block configuration of an information transmitter 1302 according to this embodiment. The information transmitter 1302 corresponds to the information transmitter 107 shown in FIG. 4. Also, components from a processor 1303 to a speaker 1309 respectively correspond to the components from the processor 401 to the speaker 407 shown in FIG. 4. In addition, components from a GPS 1311 to a bus 1315 respectively correspond to the components from the GPS 408 to the bus 412 shown in FIG. 4. In this embodiment, voice signals in the interior of an automobile 1301 can be obtained by further installing a microphone 1310 in the interior. Sensors 1306 are, for example, sensors for sensing the temperature of the interior. A camera 1307 is so configured as to be able to obtain face images of a driver and passengers in the interior of the vehicle. The sensors 1306, the camera 1307, the speaker 1309, and the microphone 1310 are installed on, for example, the dashboard, the pillar, and the roof in the interior of the vehicle.

The configuration of a behavior support system 100 is the same as that in the explanation of the first to fourth embodiments, except that the arrangement shown in FIG. 13 is used and the helmets 105 and 106 are not used. Differences from the first to fourth embodiments will be explained below. Note that in the following explanation, it is assumed that a driver A (a father), a fellow passenger B (a mother), and a fellow passenger C (a child) are on board.

Figure 14:
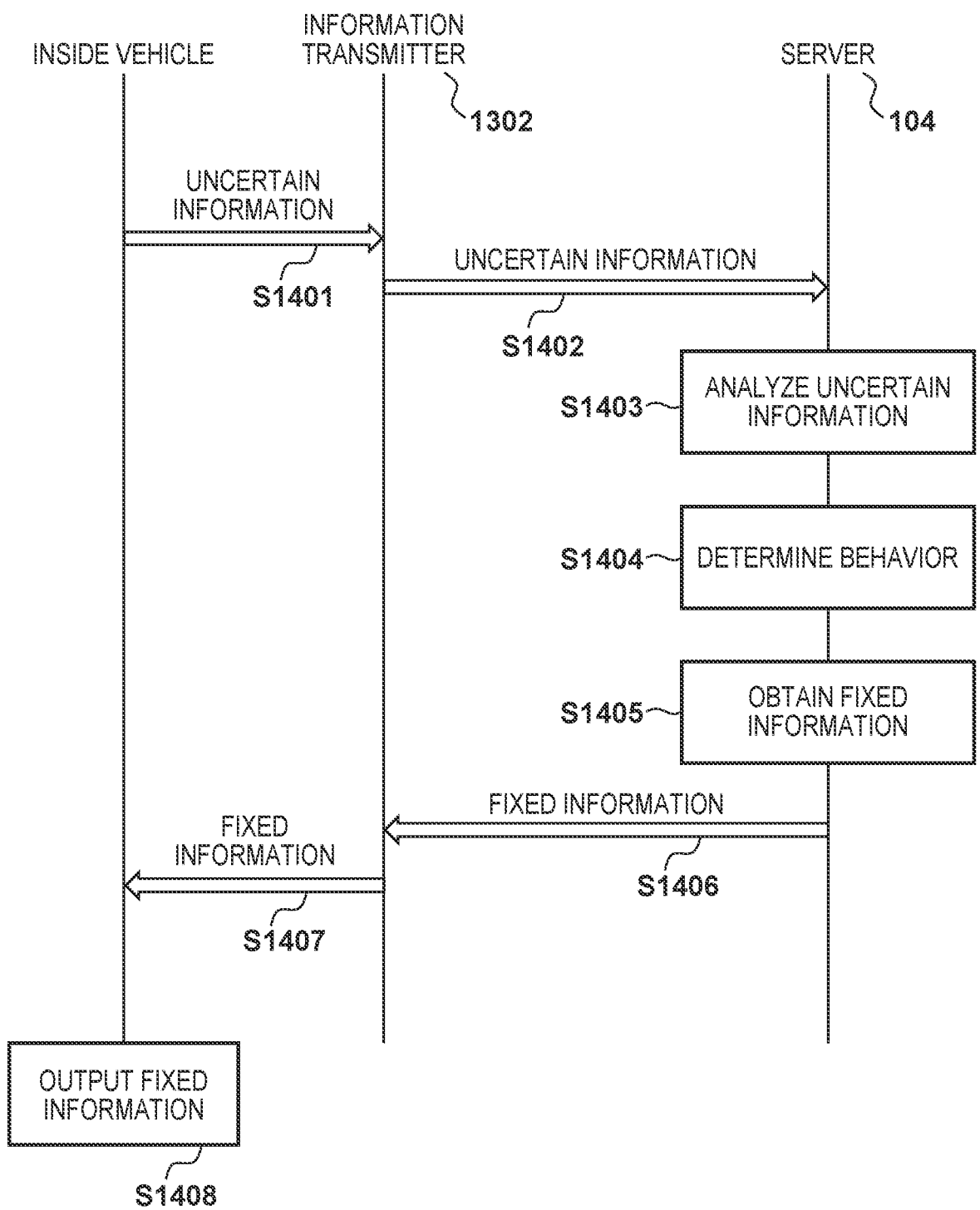
FIG. 14 is a view showing the processing sequence of a support system.

FIG. 14 is a view showing the processing sequence of the behavior support system 100 according to this embodiment. In S1401, the sensors 1306, the camera 1307, and the microphone 1310 transmit uncertain information to the information transmitter 1302. This uncertain information contains, for example, a voice signal, the temperature, and a face image. In S1402, the information transmitter 1302 transmits the uncertain information received in S1401 to a server 104.

In S1403, the server 104 analyzes the uncertain information transmitted from the information transmitter 1302. First, the server 104 identifies an image as a current analytical target, from the feature amount of the transmitted image and personal attribute information such as the sexes and ages of the driver A and the fellow passengers B and C held in a DB 605. Assume that the server 104 identifies that the image of the current analytical target is the fellow passenger C.

Then, the server 104 analyzes the behavior of the person corresponding to the image by analyzing the feature amount of the image. For example, the server 104 detects a behavior "drink juice" based on elements of the face and the movement of an object such as a can. In addition, the server 104 analyzes the behavior. For example, the server 104 evaluates the appropriateness of the behavior "drink juice", from the number of times of detection and the detection pace of the behavior "drink juice", and the personal attribute information. Assume that the server 104 evaluates that the fellow passenger C is drinking juice too much (that is, the behavior is inappropriate), from the personal attribute information such as the sex and the age of the fellow passenger C, and the number of times of detection and the detection pace of the behavior "drink juice".

In S1404, by using, as a trigger, this evaluation indicating that the behavior of the person corresponding to the image is inappropriate, the server 104 determines behaviors to be taken by the driver A and the fellow passengers B and C based on the personal attribute information of the driver A and the fellow passengers B and C held in the DB 605. Consequently, the current inappropriate behavior of the fellow passenger C can be stopped by the driver A and the fellow passengers B and C by performing the determined behaviors.

The server 104 determines behaviors that increase the satisfaction of the driver A and the fellow passengers B and C by referring to the personal attribute information of the driver A and the fellow passengers B and C. Examples of the personal attribute information to be referred to are a favorite food of the fellow passenger B, the life rhythm of the fellow passenger C, the current time, position information of the current automobile 1301, and neighborhood information.

For example, the server 104 obtains information such as (1) a case in which the fellow passenger B likes Western food and (2) a case in which the fellow passenger C goes to the bathroom many times a day, from the personal attribute information held in the DB 605, and determines a behavior "take a break in a restaurant". In S1405, the server 104 obtains fixed information related to the behavior determined in S1405. Examples of the obtained information are position information of a nearby restaurant and navigation information. In S1406, the server 104 transmits the obtained fixed information to the information transmitter 1302.

When position information of a restaurant is obtained as the fixed information as in the above example, the server 104 transmits, in S1406, navigation information as display data together with a voice guidance to the information transmitter 1302, from the current position of the automobile 1301 and the position information of the restaurant. An example of the voice guidance is "There is a restaurant that serves delicious food ahead. Taking a break there is recommended." In S1407, the information transmitter 107 displays the navigation information on the display unit 406 based on the display data. Also, the information transmitter 1302 converts the voice data received from the server 104 into a voice signal that can be played back by the speaker 1309, and plays back the above message as a voice guidance from the speaker 1309.

FIG. 15 is a flowchart showing the process of outputting fixed information according to this embodiment. This process shown in FIG. 15 corresponds to S1403 to S1405 in FIG. 14. In this embodiment as will be explained below, the automobile 1301 can perform at least some of the processes in S1403 to S1405.

In S1501, the processor 1303 analyzes uncertain information transmitted from inside the vehicle. This uncertain information contains voice signals, the temperature, and face images from the sensors 1306, the camera 1307, and the microphone 1310. In S1502, the processor 1303 determines behaviors to be taken by the driver A and the fellow passengers B and C, based on the analytical results of the uncertain information.

In S1502, the processor 1303 accesses the DB 605 corresponding to each of the driver A and the fellow passengers B and C. The DB 605 is the DB 605 of the server 104 configured as a cloud. Note that the processor 601 of the server 104 has patterned data of the DB 605 to the data in the middle portion of FIG. 16, not in synchronism with the processing of the information transmitter 1302 of the automobile 1301. For example, a processor 601 of the server 104 can periodically hold the results of data analysis and learning as the patterned data. With this configuration, the processor 1303 of the information transmitter 1302 can improve the response to the driver A and the fellow passengers B and C, although the results of learning cannot be obtained in real time. Assume that "take a break in a restaurant" is determined as a behavior to be taken in S1502.

In S1503, the processor 1303 obtains fixed information related to the determined behavior. Assume that position information of a nearby restaurant and navigation information are obtained. In S1504, the processor 1303 displays the navigation information on a display unit 1308 and plays back a voice guidance from the speaker 1309 based on the obtained fixed information.

In this embodiment as described above, it is possible to determine a behavior to be taken next from the conversation inside the vehicle, and provide the behavior as guidance information.

In the above explanation, the behaviors of the passengers (the driver A and the fellow passengers B and C) are determined in S1502 by using the inappropriate behavior of the fellow passenger C as a trigger. However, a trigger for determining the behaviors of the passengers is not limited to the inappropriate behavior of the fellow passenger C. For example, the behaviors of the passengers may also be determined based on the conversation in the vehicle and time information. In this case, if frequently appearing words in the conversation in the vehicle are, for example, "break" and "hungry" and the time information indicates a daytime zone, a behavior "take a break in a restaurant" can be determined by using them as triggers.

SUMMARY OF EMBODIMENTS

A behavior support system of each of the above embodiments is a behavior support system (100) for supporting a behavior of at least one of passengers in a vehicle (101), comprising a first obtaining unit (S702) configured to obtain uncertain information of the passengers, a first analyzing unit (S703) configured to analyze the uncertain information obtained by the first obtaining unit, a second obtaining unit (S705) configured to obtain support information for supporting behaviors of the passengers, based on a result of the analysis by the first analyzing unit, and an output unit (S708, S709) configured to output the support information obtained by the second obtaining unit.

A configuration like this can implement, for example, behavior support taking account of uncertain information obtained from passengers (a rider, a driver, and a fellow passenger) in a vehicle.

The uncertain information contains a conversation between the passengers. A configuration like this can implement, for example, behavior support taking account of a conversation between passengers.

The uncertain information contains information on at least one of a volume of a voice, a tone of a voice, and an interval in the conversation between the passengers. A configuration like this can implement, for example, behavior support taking account of at least one of a volume of a voice, a tone of a voice, and an interval in a conversation between passengers.

The uncertain information contains information of gestures of the passengers. Also, the information of gestures contains at least one of an expression and a line of sight. A configuration like this can implement, for example, behavior support taking account of gestures of passengers such as an expression and a line of sight.

The uncertain information contains biological information of the passengers. Also, the biological information contains at least one of a body temperature and a heart rate. A configuration like this can implement, for example, behavior support taking account of biological information such as a body temperature and a heart rate.

The second obtaining unit obtains the support information from the Internet. A configuration like this can implement, for example, behavior support using support information obtained from the Internet.

The second obtaining unit obtains the support information based on attribute information of the passengers. Also, the attribute information contains information indicating a taste and a preference of the passengers. A configuration like this can implement, for example, behavior support using support information obtained based on attribute information such as a taste and a preference.

The behavior support system further comprises the vehicle and a server, wherein the server comprises a database (605) configured to store the attribute information. A configuration like this can implement, for example, a behavior support system by using a vehicle such as a motorcycle or an automobile, and a database that is configured in a cloud and stores attribute information.

The behavior support system is that the server further comprises a second analyzing unit configured to analyze big data resulting from the passengers, and storing the attribute information obtained as a result of the analysis in the database, and the vehicle obtains the support information by the second obtaining unit, based on the attribute information obtained as a result of the analysis by the second analyzing unit. A configuration like this can, for example, generate attribute information by analyzing search information of a rider on the Internet. It is also possible to reduce a processing load on a vehicle by causing a server to analyze big data.

The vehicle obtains the support information by the second obtaining unit. A configuration like this can, for example, allow a vehicle such as a motorcycle or an automobile to obtain support information, and perform behavior support for passengers even when communication between the motorcycle or the vehicle and a server is disconnected.

The output unit outputs the support information obtained by the second obtaining unit to a helmet (105, 106) of at least one of the passengers. A configuration like this can output, for example, obtained support information to a speaker of a helmet of at least one of passengers.

The behavior support system is that the helmet comprises a speaker, and the speaker includes a playback unit (312) to be used to perform outputting from the output unit, and a playback unit (311) to be used in the conversation between the passengers. A configuration like this can, for example, generate support information by a playback unit different from a conversation between passengers, and output the support information without being noticed by another passenger.

The behavior support system of each of the above embodiments is a behavior support apparatus (101, 104) for supporting a behavior of at least one of passengers in a vehicle (101), comprising first obtaining unit configured to obtain uncertain information resulting from living bodies of the passengers, an analyzing unit configured to analyze the uncertain information obtained by the first obtaining unit, a second obtaining unit configured to obtain support information for supporting behaviors of the passengers, based on a result of the analysis by the analyzing unit, and an output unit configured to output the support information obtained by the second obtaining unit. The behavior support apparatus is that the apparatus is the vehicle, and the vehicle includes at least one of a saddle riding type vehicle and an automobile.

A configuration like this can implement, for example, behavior support taking account of uncertain information in a vehicle such as a motorcycle or an automobile.

REFERENCE SIGNS LIST

100 . . . behavior support system, 104 . . . server, 105, 106 . . . support information receiver

The invention claimed is:
1. A behavior support system for supporting a behavior of at least one of passengers in a saddle riding type vehicle, comprising:
a first obtaining unit configured to obtain uncertain information of a first passenger and a second passenger from helmets of the first passenger and the second passenger, the uncertain information containing at least a conversation between the passengers based on that the helmets are activated;
a first analyzing unit configured to analyze the uncertain information obtained by the first obtaining unit;

a second obtaining unit configured to obtain support information for supporting behaviors of the passengers, based on a result of the analysis by the first analyzing unit; and an output unit configured to selectively output the support information obtained by the second obtaining unit to a helmet of at least one of the first passenger and the second passenger, based on the result of the analysis by the first analyzing unit, wherein, the analysis by the first analyzing unit contains analysis performed based on a word corresponding to the second passenger obtained from the conversation, attribute information of the first passenger, and attribute information of the second passenger, if the support information obtained by the second obtaining unit is new information regarding the word for the second passenger, the output unit outputs the support information to the first passenger, without outputting the support information to the second passenger, so that the new information is provided from the first passenger to the second passenger.

2. The behavior support system according to claim 1, wherein the second obtaining unit obtains the support information, according to a state of a passenger analogized based on the result of the analysis by the first analyzing unit.

3. The behavior support system according to claim 1, wherein the attribute information contains information indicating a taste and a preference of a passenger.

4. The behavior support system according to claim 1, further comprising the saddle riding type vehicle and a server, wherein the server comprises a database configured to store the attribute information.

5. The behavior support system according to claim 4, wherein the server further comprises a second analyzing unit configured to analyze big data resulting from a passenger, and storing the attribute information obtained as a result of the analysis in the database, and the saddle riding type vehicle obtains the support information by the second obtaining unit, based on the attribute information obtained as a result of the analysis by the second analyzing unit.

6. The behavior support system according to claim 5, wherein the second obtaining unit obtains the support information based on biological information of the second passenger analogized by big data resulting from the second passenger, and the output unit outputs the support information to the first passenger.

7. The behavior support system according to claim 1, wherein the second obtaining unit obtains the support information based on the attribute information of the first passenger and the attribute information of the second passenger in a speechless state between the passengers.

8. The behavior support system according to claim 1, wherein the uncertain information contains information on at least one of a volume of a voice, a tone of a voice, and an interval in the conversation between the passengers.

9. The behavior support system according to claim 1, wherein the uncertain information contains information of a gesture of a passenger.

10. The behavior support system according to claim 9, wherein the information of the gesture contains at least one of an expression and a line of sight.

11. The behavior support system according to claim 1, wherein the uncertain information contains biological information of a passenger.

12. The behavior support system according to claim 11, wherein the biological information contains at least one of a body temperature and a heart rate.

13. The behavior support system according to claim 1, wherein the second obtaining unit obtains the support information from the Internet.

14. The behavior support system according to claim 1, wherein each of the helmets comprises a speaker, and the speaker includes a playback unit to be used to perform outputting from the output unit, and a playback unit to be used in the conversation between the passengers.

15. A behavior support apparatus for supporting a behavior of at least one of passengers in a saddle riding type vehicle, comprising:

a first obtaining unit configured to obtain uncertain information of a first passenger and a second passenger from helmets of the first passenger and the second passenger, the uncertain information containing at least a conversation between the passengers based on that the helmets are activated;

an analyzing unit configured to analyze the uncertain information obtained by the first obtaining unit;

a second obtaining unit configured to obtain support information for supporting behaviors of the passengers, based on a result of the analysis by the analyzing unit; and an output unit configured to selectively output the support information obtained by the second obtaining unit to a helmet of at least one of the first passenger and the second passenger, based on the result of the analysis by the analyzing unit, wherein, the analysis by the first analyzing unit contains analysis performed based on a word corresponding to the second passenger obtained from the conversation, attribute information of the first passenger, and attribute information of the second passenger, if the support information obtained by the second obtaining unit is new information regarding the word for the second passenger, the output unit outputs the support information to the first passenger, without outputting the support information to the second passenger, so that the new information is provided from the first passenger to the second passenger.

16. A behavior support method of supporting a behavior of at least one of passengers in a saddle riding type vehicle, comprising:

a first obtaining step of obtaining uncertain information of a first passenger and a second passenger from helmets of the first passenger and the second passenger, the uncertain information containing at least a conversation between the passengers based on that the helmets are activated;

an analyzing step of analyzing the uncertain information obtained in the first obtaining step;

a second obtaining step of obtaining support information for supporting behaviors of the passengers, based on a result of the analysis in the analyzing step; and an output step of selectively outputting the support information obtained in the second obtaining step to a helmet of at least one of the first passenger and the second passenger, based on the result of the analysis in the analyzing step, wherein, the analysis by the analyzing step contains analysis performed based on a word corresponding to the second passenger obtained from the conversation, attribute information of the first passenger, and attribute information of the second passenger, when the support information obtained by the second obtaining step is new information regarding the word for the second passenger, the output step outputs the support information to the first passenger, without outputting the support information to the second passenger, so that the new information is provided from the first passenger to the second passenger.

17. A non-transitory computer-readable storage medium storing a program causing a computer to execute:

a first obtaining step of obtaining uncertain information of a first passenger and a second passenger in a saddle riding type vehicle from helmets of the first passenger and the second passenger, the uncertain information containing at least a conversation between the passengers based on that the helmets are activated;

an analyzing step of analyzing the uncertain information obtained in the first obtaining step;

a second obtaining step of obtaining support information for supporting behaviors of the passengers, based on a result of the analysis in the analyzing step; and an output step of selectively outputting the support information obtained in the second obtaining step to a helmet of at least one of the first passenger and the second passenger, based on the result of the analysis in the analyzing step wherein, the analyzing of the uncertain information includes analysis performed based on a word corresponding to the second passenger obtained from the conversation, attribute information of the first passenger, and attribute information of the second passenger, and when the support information obtained in the second obtaining step is new information regarding the word for the second passenger, the output step outputs the support information to the first passenger, without outputting the support information to the second passenger, so that the new information is provided from the first passenger to the second passenger.

* * * * *